United States Patent
Kikkawa

(10) Patent No.: US 12,023,814 B2
(45) Date of Patent: Jul. 2, 2024

(54) MOBILE OBJECT AND CONTROL METHOD

(71) Applicant: SONY CORPORATION, Tokyo (JP)

(72) Inventor: Norifumi Kikkawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 638 days.

(21) Appl. No.: 17/250,403

(22) PCT Filed: Jul. 12, 2019

(86) PCT No.: PCT/JP2019/027644
§ 371 (c)(1),
(2) Date: Jan. 18, 2021

(87) PCT Pub. No.: WO2020/022102
PCT Pub. Date: Jan. 30, 2020

(65) Prior Publication Data
US 2021/0308867 A1    Oct. 7, 2021

(30) Foreign Application Priority Data

Jul. 27, 2018 (JP) .................................. 2018-141520

(51) Int. Cl.
*B25J 9/16* (2006.01)

(52) U.S. Cl.
CPC ............. *B25J 9/1674* (2013.01); *B25J 9/162* (2013.01); *B25J 9/1653* (2013.01); *B25J 9/1661* (2013.01); *B25J 9/1664* (2013.01); *B25J 9/1679* (2013.01)

(58) Field of Classification Search
None
See application file for complete search history.

(56) References Cited

U.S. PATENT DOCUMENTS

| | | | |
|---|---|---|---|
| 2008/0109114 A1 | 5/2008 | Orita et al. | |
| 2014/0236353 A1* | 8/2014 | Annaz | B25J 19/066 |
| | | | 700/253 |
| 2016/0216711 A1* | 7/2016 | Srivastava | G08G 5/006 |
| 2017/0336787 A1 | 11/2017 | Pichlmaier et al. | |
| 2019/0138019 A1 | 5/2019 | Hayashi | |

FOREIGN PATENT DOCUMENTS

| | | | |
|---|---|---|---|
| CN | 103340190 A | * | 10/2013 |
| CN | 109526208 A | | 3/2019 |
| GB | 2566881 A | | 3/2019 |

(Continued)

OTHER PUBLICATIONS

International Search Report and Written Opinion of PCT Application No. PCT/JP2019/027644, dated Oct. 8, 2019, 10 pages of ISRWO.

*Primary Examiner* — Peter D Nolan
*Assistant Examiner* — Jacob Kent Besteman-Street
(74) *Attorney, Agent, or Firm* — CHIP LAW GROUP

(57) ABSTRACT

The present technology relates to a mobile object and a control method that enable improvement of work efficiency. The mobile object controls a drive system that performs maintenance work in accordance with a maintenance plan generated in response to a work cost related to main work according to a work plan, or related to the maintenance work for maintenance of a work mobile object that performs the main work. The present technology can be applied to, for example, a maintenance mobile object that performs maintenance work for maintenance of a work mobile object that performs main work.

8 Claims, 14 Drawing Sheets

(56) References Cited

FOREIGN PATENT DOCUMENTS

| | | | |
|---|---|---|---|
| JP | 03-285502 | A | 12/1991 |
| JP | 05-233059 | A | 9/1993 |
| JP | 2001-179668 | A | 7/2001 |
| JP | 2006-106919 | A | 4/2006 |
| JP | 2007-065255 | A | 3/2007 |
| JP | 2007065255 | A * | 3/2007 |
| JP | 2016-099704 | A | 5/2016 |
| JP | 2018-500655 | A | 1/2018 |
| WO | 2006/038576 | A1 | 4/2006 |
| WO | 2016/087535 | A1 | 6/2016 |
| WO | 2018/012446 | A1 | 1/2018 |

* cited by examiner

FIG. 11

ROUTE MANAGEMENT TABLE

| ROUTE INFORMATION | END POINT A | END POINT B | LENGTH | CONDITION | UPDATE TIME |
|---|---|---|---|---|---|
| R1 | (5, 10) | (4, 125) | 128 | OPEN | 2018-03-30 18:32:13.124 |
| R2 | (5, 10) | (66, 1) | 49 | OPEN | 2018-03-30 18:36:31.314 |
| R3 | (66, 1) | (92, 1) | 26 | OPEN | 2018-03-30 18:34:25.241 |
| R4 | (92, 1) | (112, 1) | 20 | CLOSED | 2018-03-30 18:20:03.829 |
| ... | | | | | |

ROUTE MANAGEMENT DB
51

FIG. 12

WORK MANAGEMENT TABLE

| JOB ID | Start | Goal | Status | WORK ROBOT ID | ESTIMATED START TIME | ESTIMATED COMPLETION TIME |
|---|---|---|---|---|---|---|
| J1 | (32, 19) | (21, 14) | IN PROGRESS | W1 | | 2018-03-30 18:38:30 |
| J2 | (3, 20) | (72, 28) | ASSIGNED | W1 | 2018-03-30 18:42:15 | 2018-03-30 18:54:35 |
| J3 | (126, 1) | (142, 24) | IN PROGRESS | W2 | | 2018-03-30 18:42:20 |
| J4 | (91, 142) | (81, 138) | ASSIGNED | W3 | 2018-03-30 18:37:50 | 2018-03-30 18:46:05 |
| J5 | (71, 145) | (32, 121) | ASSIGNED | W3 | 2018-03-30 18:49:10 | 2018-03-30 18:55:55 |
| J6 | (122, 121) | (150, 21) | ASSIGNED | W5 | 2018-03-30 18:44:50 | 2018-03-30 18:59:25 |

↑ ADDED

WORK MOBILE OBJECT MANAGEMENT TABLE

| TRANSPORT ROBOT ID | STATUS | JOB ID | SCHEDULED ROUTE | CURRENT POSITION | UPDATE TIME |
|---|---|---|---|---|---|
| W1 | JOB BEING EXECUTED | J1 → J2 | R6→R44→R2... | (25, 17) | 2018-03-30 18:32:13.124 |
| W2 | JOB BEING EXECUTED | J3 | R14 | (131, 22) | 2018-03-30 18:36:31.314 |
| W3 | MOVING FOR JOB | J4 → J5 | R27→R79→R79... | (105, 150) | 2018-03-30 18:34:25.241 |
| W4 | BEING DIAGNOSED | | | (56, 62) | 2018-03-30 18:20:03.829 |
| W5 | STANDBY → MOVING FOR JOB | NONE ⇒ J6 | R26→R81→R81... | (134, 143) | 2018-03-30 18:25:13.228 |

WORK MANAGEMENT DB ⟩ 31

FIG. 13

MAINTENANCE MANAGEMENT TABLE

| MAINTENANCE WORK ID | TRANSPORT ROBOT ID | DIAGNOSIS STATUS | DIAGNOSTIC ROBOT ID | UPDATE TIME |
|---|---|---|---|---|
| M01 | W1 | DIAGNOSED | — | 2018-03-30 18:32:13.124 |
| M02 | W2 | TO BE DIAGNOSED | D2 | 2018-03-30 18:36:31.314 |
| M03 | W3 | TO BE DIAGNOSED | D1 | 2018-03-30 18:34:25.241 |
| M04 | W4 | BEING DIAGNOSED | D1 | 2018-03-30 18:20:03.829 |
| M05 | W5 | TO BE DIAGNOSED | D3 ⇒ D2 | 2018-03-30 18:25:13.228 |

MAINTENANCE MOBILE OBJECT MANAGEMENT TABLE

| DIAGNOSTIC ROBOT ID | STATUS | DIAGNOSIS TARGET TRANSPORT ROBOT ID | SCHEDULED ROUTE | CURRENT POSITION | UPDATE TIME | NEXT MEDICAL TREATMENT COMPLETION SCHEDULE |
|---|---|---|---|---|---|---|
| D1 | BEING DIAGNOSED | W4 → W3 | R9→R45→R46... | (56, 62) | 2018-03-30 18:31:15 | 2018-03-30 18:41:30 |
| D2 | MOVING FOR DIAGNOSIS | W2 ⇒ W2 → W5 | R13→R14 ⇒ R13→R13→R13 | (105, 30) | 2018-03-30 18:42:15 | 2018-03-30 18:54:35 |
| D3 | MOVING FOR DIAGNOSIS ⇒ STANDBY | W5 ⇒ NONE | R26 ⇒ NONE | (152, 157) | | 2018-03-30 18:42:20 ⇒ NONE |

MAINTENANCE MANAGEMENT DB 41

MOBILE OBJECT AND CONTROL METHOD

CROSS REFERENCE TO RELATED APPLICATIONS

This application is a U.S. National Phase of International Patent Application No. PCT/JP2019/027644 filed on Jul. 12, 2019, which claims priority benefit of Japanese Patent Application No. JP 2018-141520 filed in the Japan Patent Office on Jul. 27, 2018. Each of the above-referenced applications is hereby incorporated herein by reference in its entirety.

TECHNICAL FIELD

The present technology relates to a mobile object and a control method, and particularly relates to, for example, a mobile object and a control method that enable improvement of work efficiency.

BACKGROUND ART

For example, Patent Document 1 describes a mobile robot system in which a plurality of mobile robots moves to a work station to perform work, and the mobile robot is charged as needed.

Furthermore, for example, Patent Document 2 describes a distribution work robot system having a robot for control and monitor that controls a working robot, a transfer robot, and a satellite robot, and a robot for power supply that supplies power to the working robot, the transfer robot, the satellite robot, and the robot for control and monitor.

CITATION LIST

Patent Document

Patent Document 1: Japanese Patent Application Laid-Open No. H03-285502
Patent Document 2: Japanese Patent Application Laid-Open No. H05-233059

SUMMARY OF THE INVENTION

Problems to be Solved by the Invention

For a work system having a movable work mobile object that performs main work that should be originally done, it is expected that a movable maintenance mobile object for maintenance of the work mobile object will be introduced. Then, for the work system having the work mobile object and the maintenance mobile object, it is expected that demand for improving work efficiency of the main work and the maintenance work will increase.

The present technology has been made in view of such a situation, and is intended to improve work efficiency.

Solutions to Problems

A mobile object of the present technology is a mobile object including: a maintenance work control unit configured to control a drive system that performs maintenance work in accordance with a maintenance plan generated in response to a work cost related to main work according to a work plan, or related to the maintenance work for maintenance of a work mobile object that performs the main work.

A control method of the present technology is a control method of a mobile object. The control method includes a step of controlling a drive system that performs maintenance work in accordance with a maintenance plan generated in response to a work cost related to main work according to a work plan, or related to the maintenance work for maintenance of a work mobile object that performs the main work.

In the mobile object and the control method of the present technology, control is performed on the drive system that performs maintenance work in accordance with a maintenance plan generated in response to a work cost related to main work according to a work plan, or related to the maintenance work for maintenance of a work mobile object that performs the main work.

Note that the control method of the present technology can be realized by causing a computer to execute a program. This program can be distributed by being transmitted via a transmission medium or by being recorded on a recording medium.

Effects of the Invention

According to the present technology, work efficiency can be improved.

Note that the effects described herein are not necessarily limited, and any of the effects described in the present disclosure is possible.

BRIEF DESCRIPTION OF DRAWINGS

FIG. 11 is a view showing an example of a route management table stored in the route management DB 51 of the route management server 50 in the transport system.
FIG. 12 is a view showing an example of a work management table and a work mobile object management table stored in the work management DB 31 of the work management server 30 in the transport system.
FIG. 13 is a view showing an example of a maintenance management table and a maintenance mobile object management table stored in the maintenance management DB 41 of the maintenance management server 40 in the transport system.

MODE FOR CARRYING OUT THE INVENTION

<Work System Applied with Present Technology>

Figure 1:
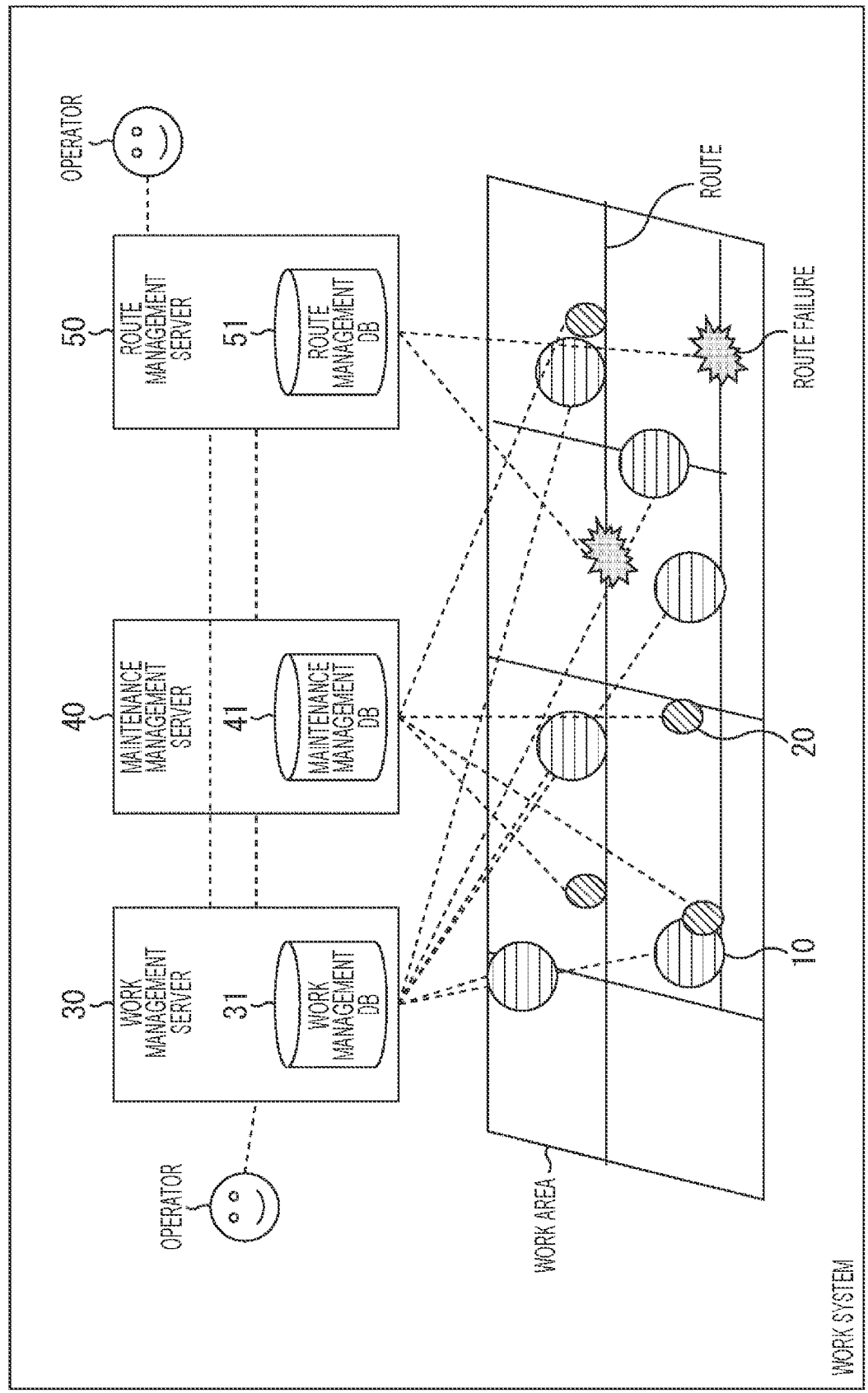
FIG. 1 is a diagram showing a configuration example of an embodiment of a work system to which the present technology is applied.

FIG. 1 is a diagram showing a configuration example of an embodiment of a work system to which the present technology is applied.

In FIG. 1, the work system has one or more work mobile objects 10, one or more maintenance mobile objects 20, a work management server 30, a maintenance management server 40, and a route management server 50.

The work mobile object 10 is configured by, for example, a movable robot. The work mobile object 10 moves on a route in a work area in accordance with a work plan of main work generated by the work management server 30, and performs the main work.

Here, the work area is an area (an environment) where the main work is performed.

The main work is work that should be originally done in the work area. For example, in a case where the work system is applied to a transport system in which a certain cargo (freight) in a certain rack is transported and stored in a target rack, the main work is a series of work of taking out a certain cargo in a certain rack, loading, moving to a target rack, and storing in the rack.

The maintenance mobile object 20 is configured by, for example, a movable robot. The maintenance mobile object 20 moves on a route in the work area and performs maintenance work, in accordance with a maintenance plan that is generated by the maintenance management server 40 and is for maintenance work to maintain the work mobile object 10.

Here, the maintenance (work) includes all procedures taken for normal operation of the work mobile object 10 and for keeping the normal operation of the work mobile object 10, such as, for example, charging the work mobile object 10, repairing a fault, checking whether or not it is failed (normally operating), and other procedures.

The maintenance mobile object 20 comes close to the work mobile object 10 by movement of one or both of the work mobile object 10 and the maintenance mobile object 20, and performs maintenance work on the work mobile object 10. Therefore, the maintenance mobile object 20 can perform an action that physically acts on the work mobile object 10, as the maintenance work.

For example, the maintenance mobile object 20 can perform maintenance work of presenting a cargo in front of the work mobile object 10, and confirming whether or not the work mobile object 10 correctly detects the cargo.

Furthermore, for example, the maintenance mobile object 20 can perform maintenance work of, for example, presenting a marker for camera calibration and causing a camera as a sensor included in the work mobile object 10 to capture an image of the marker to calibrate the camera.

In addition, the maintenance mobile object 20 can perform maintenance work such as charging the work mobile object 10 and repairing a fault.

The work management server 30 has a work management database (DB) 31 that stores a work plan and the like of the main work. The work management server 30 generates a work plan for the main work in accordance with, for example, an operation or the like of an operator of the work management server 30. The generation of the work plan includes dynamically updating the work plan in response to a progress condition and the like of the main work of each work mobile object 10. The work management server 30 transmits the work plan to each work mobile object 10 by a communication means such as wireless communication.

The maintenance management server 40 has a maintenance management DB 41 that stores a maintenance plan and the like for maintenance work. The maintenance management server 40 generates a maintenance plan in response to a work cost related to the main work according to the work plan generated by the work management server 30, or related to the maintenance work for maintenance of the work mobile object 10. The generation of the maintenance plan includes dynamically updating the maintenance plan in response to a progress condition and the like of the maintenance work of each maintenance mobile object 20.

The route management server 50 has a route management DB 51 that stores information regarding a route, such as a route failure. The route management server 50 manages information regarding a route, and generates a recovery plan for recovering a route having a failure. The recovery plan is subjected to presentation and the like to the operator of the route management server 50, for example.

Note that the work system may include one or more work mobile objects 10, and may include a plurality of work mobile objects 10. Moreover, the work system can include one or more maintenance mobile objects 20, and may include a plurality of maintenance mobile objects 20.

Here, in the present embodiment, in order to simplify the explanation, a mobile object that moves on the ground (floor or the like) is adopted as the work mobile object 10. However, in addition to the mobile object that move on the ground, as the work mobile object 10, a mobile object that moves on a wall, a windowpane, and the like, or a mobile object that moves in the air (a drone, and the like) can be adopted. This similarly applies to the maintenance mobile object 20.

<Processing of Work System>

Figure 2:
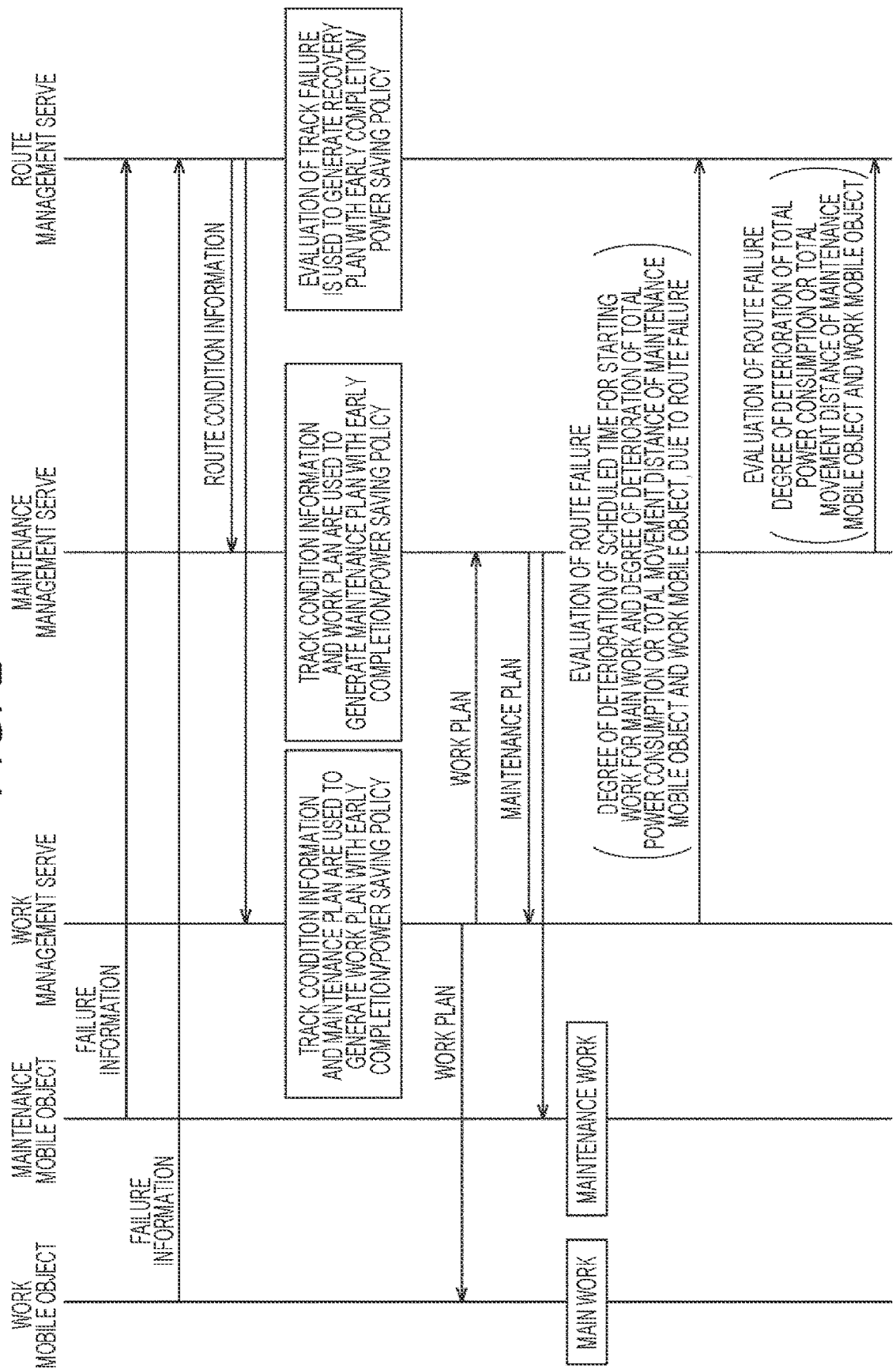
FIG. 2 is a diagram for explaining an example of processing in the work system.

FIG. 2 is a diagram for explaining an example of processing in the work system of FIG. 1.

<Work Mobile Object 10>

The work mobile object 10 receives a work plan transmitted from the work management server 30. Then, the work mobile object 10 moves to a place where the main work is performed in accordance with the work plan from the work management server 30, and performs the main work.

Moreover, the work mobile object 10 senses surroundings during the main work, during movement to the place where the main work is performed, and the like, and uses a sensing result to recognize a surrounding failure, for example, a failure occurring in the route (a route failure). Then, the work mobile object 10 transmits failure information regarding the route failure to the route management server 50.

Here, route failures include, for example, a case where the route is physically broken, such as having a hole in the route, a case where there is an obstacle on the route to inhibit passage, a case where a large number of the work mobile objects 10 and maintenance mobile objects 20 are densely gathered on the route to inhibit passage (when the route is congested), and the like.

<Maintenance Mobile Object 20>

The maintenance mobile object 20 receives a maintenance plan transmitted from the maintenance management server 40. Then, the maintenance mobile object 20 moves to a place where the maintenance work is performed in accordance with the maintenance plan from the maintenance management server 40, and performs the maintenance work of the work mobile object 10.

Moreover, the maintenance mobile object 20 senses surroundings during the maintenance work, during movement to a place where maintenance work is performed, and the like, and uses a sensing result to recognize a surrounding failure, for example, a route failure. Then, the work mobile object 10 transmits failure information regarding the route failure to the route management server 50.

<Work Management Server 30>

The work management server 30 receives a maintenance plan transmitted from the maintenance management server 40, and also receives route condition information transmitted from the route management server 50.

The work management server 30 generates (updates) a work plan by using the maintenance plan from the maintenance management server 40 and the route condition information from the route management server 50 as required, in accordance with an operation of the operator (a work manager) of the work management server 30.

That is, the work management server 30 checks whether or not the operator of the work management server 30 has performed an operation so as to input new main work or to cancel work that has already been inputted. Then, in a case where it is confirmed that the operation has been performed so as to input new main work or to cancel main work that has already been inputted, the work plan is updated.

On the work management server 30, the work plan is updated with use of a maintenance plan and route condition information as required, in accordance with an early completion policy, a power saving policy, or a policy that combines the early completion policy and the power saving policy.

Here, the early completion policy is a policy with priority given to making earlier a scheduled completion time at which the main work, the maintenance work, or both the main work and maintenance work are completed. According to the early completion policy, a scheduled completion time at which the main work, the maintenance work, or both the main work and maintenance work are completed is used as a work cost related to the main work, the maintenance work, or both the main work and maintenance work. Then, in response to the scheduled completion time as the work cost, the work plan is updated such that the scheduled completion time becomes earlier. Note that the time includes a time zone having a certain range.

The power saving policy is a policy with priority given to reducing a total power consumption of the work mobile object 10 and the maintenance mobile object 20, required for the main work, the maintenance work, or both the main work and maintenance work. According to the power saving policy, a total power consumption of the work mobile object 10 and the maintenance mobile object 20 required for the main work, the maintenance work, or both the main work and maintenance work is used as a work cost related to the main work, the maintenance work, or both the main work and maintenance work. Then, in response to the total power consumption as the work cost, the work plan is updated such that the total power consumption becomes smaller.

For example, in a case where new main work is inputted, when the work plan is updated in accordance with the early completion policy, in the work plan, the new main work can be assigned to the work mobile object 10 that requires a minimum movement time to move to a place (a work place) where the new main work is performed, from among the work mobile objects 10 to which main work has not been assigned. That is, the new main work can be assigned to the work mobile object 10 that can start the new main work earliest (and thus complete earliest).

In a case where there is no work mobile object 10 to which main work has not been assigned, the new main work can be assigned to the work mobile object 10 that can start earliest in response to the scheduled completion time at which each work mobile object 10 completes the currently assigned main work, and a movement time required for each work mobile object 10 to move from a current work place to a new main work place.

Furthermore, for example, in a case where new main work is inputted, when the work plan is updated in accordance with the power saving policy, in the work plan, the new main work can be assigned to the work mobile object 10 that minimizes a total power consumption of the work mobile object 10 required for existing main work and new main work, or a total power consumption of the work mobile object 10 and the maintenance mobile object 20 required for the existing main work, the new main work, and the existing maintenance work, from among all the work mobile objects 10.

The existing main work is main work included in the latest work plan, and the existing maintenance work is maintenance work included in the latest maintenance plan.

According to the power saving policy, in a case where new main work is added to existing main work, the new main work is assigned to the work mobile object 10 so as to further reduce a total power consumption required for all main work and all maintenance work after the new main work is added.

Note that the work management server 30 can use the maintenance plan and the route condition information as required in a case of updating the work plan in accordance with the early completion policy, the power saving policy, and the like.

For example, on the basis of the maintenance plan, the work management server 30 can recognize the work mobile object 10 that has been subjected to the maintenance at a time when updating the work plan, and can preferentially assign new main work to the work mobile object 10 that has been subjected to the maintenance at a time when updating the work plan. In this case, a change (update) of the maintenance plan can be suppressed.

Furthermore, for example, the work management server 30 can recognize a route failure on the basis of the route condition information, and can consider a movement distance to be increased to bypass that route failure, to calculate the scheduled completion time and the total power consumption as work costs.

In a case where the work management server 30 updates the work plan, the work management server 30 transmits the updated work plan to the work mobile object 10 and the maintenance management server 40.

Furthermore, the work management server 30 evaluates a route failure represented by the route condition information from the route management server 50. That is, the work management server 30 generates, as an evaluation of the route failure, deterioration information indicating a degree of deterioration of a scheduled time for starting or completing work for the main work and a degree of deterioration of the total power consumption (or a total movement distance) of the work mobile object 10 required for the main work, due to the route failure. Then, the work management server 30 transmits the deterioration information to the route management server 50.

Here, as a degree of deterioration of the scheduled time for starting or completing of the main work due to the route failure, it is possible to adopt, for example, a difference between a scheduled time for starting or completing work for the main work in a case where there is no route failure and a scheduled time for starting or completing work for the main work after the route failure occurs, and the like. This similarly applies to a degree of deterioration of total power consumption.

<Maintenance Management Server 40>

The maintenance management server 40 receives a work plan transmitted from the work management server 30, and also receives route condition information transmitted from the route management server 50.

The maintenance management server 40 uses the work plan from the work management server 30 and the route condition information from the route management server 50 as required, to generate a maintenance plan.

That is, the maintenance management server 40 updates the maintenance plan so that each work mobile object 10 is subjected to maintenance at a predetermined maintenance interval.

On the maintenance management server 40, the maintenance plan is updated with use of a work plan and route condition information as required, in accordance with the early completion policy, the power saving policy, or a policy that combines the early completion policy and the power saving policy.

Here, according to the early completion policy, the scheduled completion time at which the main work, the maintenance work, or both the main work and maintenance work are completed is used as a work cost related to the main work, the maintenance work, or both the main work and maintenance work. Then, the maintenance plan is updated such that the scheduled completion time becomes earlier in response to the scheduled completion time as the work cost.

Furthermore, according to the power saving policy, a total power consumption of the work mobile object 10 and the maintenance mobile object 20 required for the main work, the maintenance work, or both the main work and maintenance work is used as a work cost related to the main work, the maintenance work, or both the main work and maintenance work. Then, the maintenance plan is updated such that the total power consumption becomes smaller in response to the total power consumption as the work cost.

In a case where the maintenance plan is updated in accordance with the early completion policy, the maintenance mobile object 20 in charge of the maintenance of the work mobile object 10 can be assigned to the work mobile object 10 such that, for example, the scheduled completion time at which the existing main work is completed becomes earlier. In this case, a maintenance time zone for performing maintenance of the work mobile object 10 can be adjusted so as to be a free time zone in which the work mobile object 10 does not perform the main work. In the maintenance management server 40, the free time zone in which the work mobile object 10 does not perform the main work can be recognized on the basis of the work plan from the work management server 30.

Furthermore, in a case where the update of the work plan causes the maintenance time zone for performing maintenance of the work mobile object 10 to overlap with the work time zone for the work mobile object 10 to perform the main work, the maintenance work in the maintenance time zone overlapping with the work time zone can be canceled. In this case, by inputting again the maintenance work for maintenance of the work mobile object 10 that has been scheduled for maintenance with the canceled maintenance work, the maintenance plan can be updated to reflect the maintenance work.

Moreover, according to the early completion policy, considering, for example, the scheduled completion time at which the work mobile object 10 completes the main work and a movement time in which the work mobile object 10 and the maintenance mobile object 20 move for the maintenance of the work mobile object 10, the maintenance mobile object 20 in charge of the maintenance of the work mobile object 10 can be assigned to the work mobile object 10 such that the scheduled completion time at which the existing maintenance work is completed becomes earlier.

In a case where the maintenance plan is updated in accordance with the power saving policy, the maintenance mobile object 20 in charge of maintenance of the work mobile object 10 can be assigned to the work mobile object 10, for example, so as to reduce a total power consumption of the work mobile object 10 and the maintenance mobile object 20 required for the existing maintenance work.

Note that, in updating the maintenance plan according to the power saving policy, in a case where there is a difference in power required for movement between the work mobile object 10 and the maintenance mobile object 20, the maintenance plan can be updated in consideration of the difference. For example, in a case where the maintenance mobile object 20 can move with a lower power consumption than that of the work mobile object 10, the maintenance plan can be updated such that the maintenance mobile object 20 moves to a position of the work mobile object 10 to perform the maintenance work.

Furthermore, the maintenance management server 40 can recognize a route failure on the basis of the route condition information from the route management server 50, and can consider a movement distance to be increased to bypass that route failure, to calculate a scheduled completion time and a total power consumption as work costs.

In a case where the maintenance management server 40 updates the maintenance plan, the maintenance management server 40 transmits the updated maintenance plan to the maintenance mobile object 20 and the work management server 30.

Furthermore, the maintenance management server 40 evaluates a route failure represented by the route condition information from the route management server 50. That is, the maintenance management server 40 generates, as an evaluation of the route failure, deterioration information indicating a degree of deterioration of a scheduled time for starting or completing work for the maintenance work and a degree of deterioration of a total power consumption (or a total movement distance) of the maintenance mobile object 20 (and the work mobile object 10) required for the maintenance work, due to the route failure. Then, the maintenance management server 40 transmits the deterioration information to the route management server 50.

<Route Management Server 50>

The route management server 50 receives failure information of a route failure transmitted from the work mobile object 10 and the maintenance mobile object 20, and also receives deterioration information as an evaluation of the route failure transmitted from the work management server 30 and the maintenance management server 40. The failure information and the deterioration information are stored in the route management DB 51 of the route management server 50.

Then, the route management server 50 generates route condition information that represents a route condition and includes failure information from the work mobile object 10 and the maintenance mobile object 20, and transmits to the work management server 30 and the maintenance management server 40.

Furthermore, the route management server 50 uses the deterioration information as an evaluation of the route failure, to generate (update) a recovery plan for recovery from the route failure, with the early completion policy, the power saving policy, or a policy that combines the early completion policy and the power saving policy.

Here, according to the early completion policy, a scheduled completion time at which the main work, the maintenance work, or both the main work and maintenance work are completed is used as a work cost related to the main work, the maintenance work, or both the main work and maintenance work. Then, the recovery plan is updated such that the scheduled completion time becomes earlier in response to the scheduled completion time as the work cost.

Furthermore, according to the power saving policy, a total power consumption of the work mobile object 10 and the maintenance mobile object 20 required for the main work, the maintenance work, or both the main work and maintenance work is used as a work cost related to the main work, the maintenance work, or both the main work and maintenance work. Then, the recovery plan is updated such that the total power consumption becomes smaller in response to the total power consumption as the work cost.

In a case where the recovery plan is updated in accordance with the early completion policy, the recovery plan can be made such that the scheduled completion time at which the existing main work or maintenance work is completed becomes earlier, for example, with use of deterioration information from the work management server 30 or the maintenance management server 40.

That is, when the failure information is received from the work mobile object 10 or the maintenance mobile object 20, the route management server 50 generates route condition information including the failure information, and transmits to the work management server 30 and the maintenance management server 40. For the route condition information from the route management server 50, the work management server 30 and the maintenance management server 40 transmit the deterioration information as an evaluation of the route failure as described above, to the route management server 50. The work management server 30 can refer to the deterioration information to make a recovery plan for recovery from the route failure, in descending order of a degree of deterioration of the scheduled completion time of the existing main work or maintenance work.

In a case where the recovery plan is updated in accordance with the power saving policy, a recovery plan can be made so as to reduce the total power consumption of the work mobile object 10 and the maintenance mobile object 20 required for the existing main work and maintenance work, for example, with use of the deterioration information from the work management server 30 and the maintenance management server 40.

That is, when the failure information is received from the work mobile object 10 or the maintenance mobile object 20, the route management server 50 generates route condition information including the failure information, and transmits to the work management server 30 and the maintenance management server 40. For the route condition information from the route management server 50, the work management server 30 and the maintenance management server 40 transmit the deterioration information as an evaluation of the route failure as described above, to the route management server 50. The work management server 30 can refer to the deterioration information, to make a recovery plan so as to recover from the route failure, in descending order of a degree of deterioration of the total power consumption of the work mobile object 10 and the maintenance mobile object 20 required for the existing main work and maintenance work.

As described above, the maintenance mobile object 20 performs the maintenance work (controls a drive system 25 as described later) in accordance with the maintenance plan generated in response to the work cost related to the main work and the maintenance work. Therefore, the work efficiency of the main work and the maintenance work can be improved.

That is, by adopting, as the work cost, the scheduled completion time at which the main work and maintenance work are completed, and the total power consumption of the work mobile object 10 and the maintenance mobile object 20 required for the main work and maintenance work, the maintenance mobile object 20 performs the maintenance work in accordance with a maintenance plan generated with priority given to making the scheduled completion time early, and a maintenance plan generated with priority given to reducing the total power consumption of the work mobile object 10 and the maintenance mobile object 20. Therefore, it is possible to make the scheduled completion time early and reduce the total power consumption.

Furthermore, since the maintenance mobile object 20 comes close to the work mobile object 10 to perform maintenance work on the work mobile object 10, it is possible to perform maintenance on the work mobile object 10 to exert a physical action that cannot be performed remotely.

Moreover, the route management server 50 makes a recovery plan for recovery from the route failure in descending order of a degree of deterioration of the scheduled completion time of the existing main work and maintenance work, or in descending order of a degree of deterioration of the total power consumption of the work mobile object 10 and the maintenance mobile object 20. Therefore, it is possible to suppress a degree of delay of the scheduled completion time and a degree of an increase of the total power consumption due to the route failure.

Furthermore, according to the work system of FIG. 1, for one or more work mobile objects 10, it is possible to perform maintenance work that cannot be performed unless coming close to the work mobile object 10, without the work mobile object 10 moving extra for maintenance or interrupting of the main work.

<Outline of Work Management DB 31, Maintenance Management DB 41, and Route Management DB 51>

Figure 3:
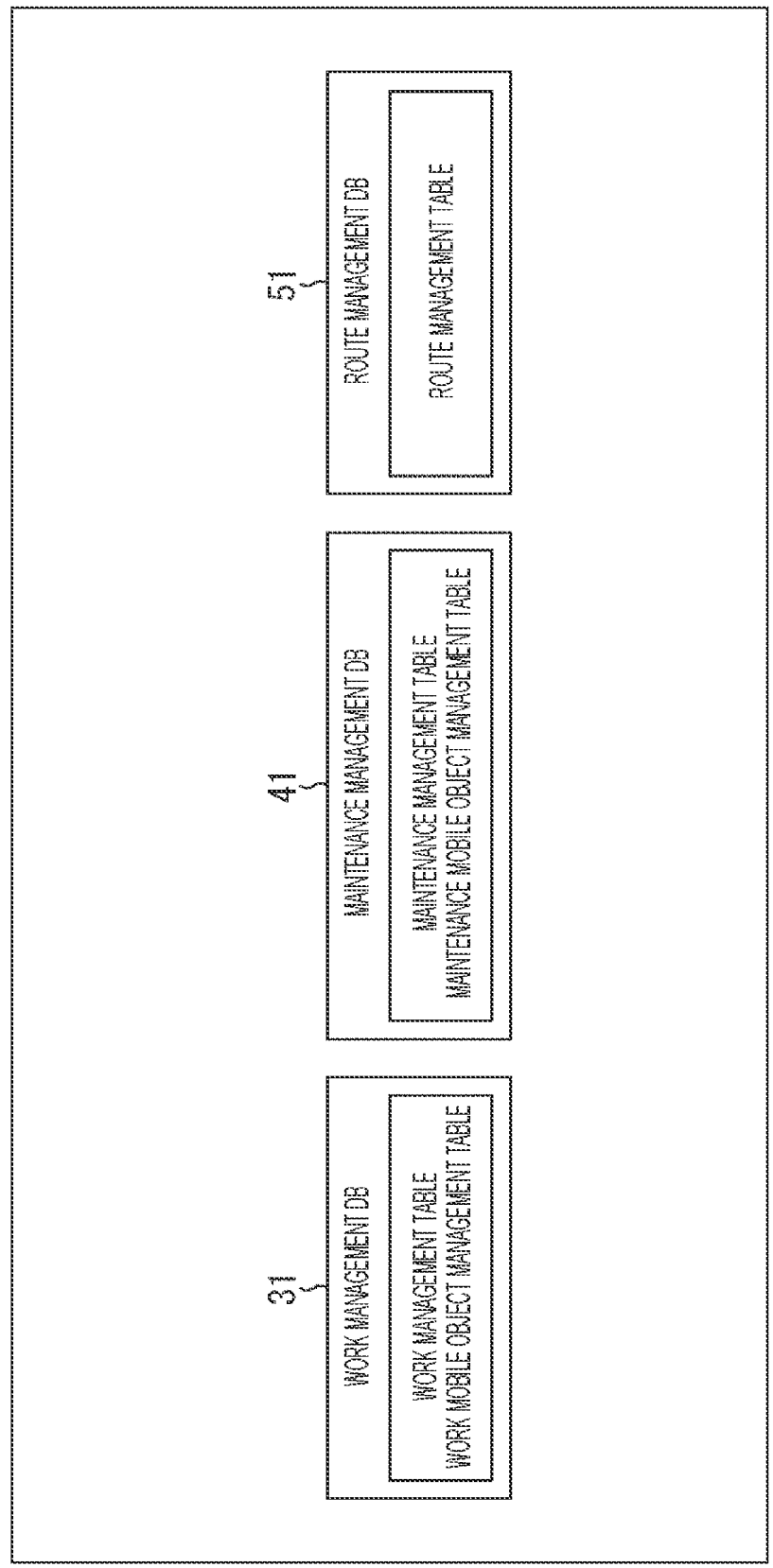
FIG. 3 is a diagram for explaining an outline of a work management DB 31, a maintenance management DB 41, and a route management DB 51.

FIG. 3 is a diagram for explaining an outline of the work management DB 31, the maintenance management DB 41, and the route management DB 51 of FIG. 1.

The work management DB 31 stores a work management table including information as a work plan, a work mobile object management table, and the like.

In the work management table, information regarding main work is registered. For example, in the work management table, main work, the work mobile object 10 assigned to that main work, and (information as to) whether or not the main work to which the work mobile object 10 is assigned is being executed, and the like, are associated with each other, and registered as (a part of) the work plan.

In the work mobile object management table, information regarding the work mobile object 10 that performs main work is registered. For example, in the work mobile object management table, the work mobile object 10, a state (a condition) of the work mobile object 10, and (information of) a route (a scheduled route) and the like on which the work mobile object 10 is scheduled to move in the future are associated with each other, and registered as the work plan.

The maintenance management DB 41 stores a maintenance management table including information as a maintenance plan, a maintenance mobile object management table, and the like.

In the maintenance management table, information regarding maintenance work is registered. For example, in the maintenance management table, (information of) the maintenance mobile object 20 in charge of maintenance of the work mobile object 10, and the like, are registered as a maintenance plan for every work mobile object 10 to be subjected to maintenance.

In the maintenance mobile object management table, information regarding the maintenance mobile object 20 that performs maintenance work is registered. For example, in the maintenance mobile object management table, (information of) the maintenance mobile object 20, a state of the maintenance mobile object 20, a scheduled route on which the maintenance mobile object 20 moves in the future, and the like are associated with each other and registered as a maintenance plan.

The route management DB 51 stores a route management table including information as route condition information, a recovery plan, and the like.

In the route management table, work area route information (for example, such as coordinates of two end points of a straight (line segment) route), (information of) the presence or absence of a route failure, and the like are registered.

<Configuration Example of Work Mobile Object 10>

Figure 4:
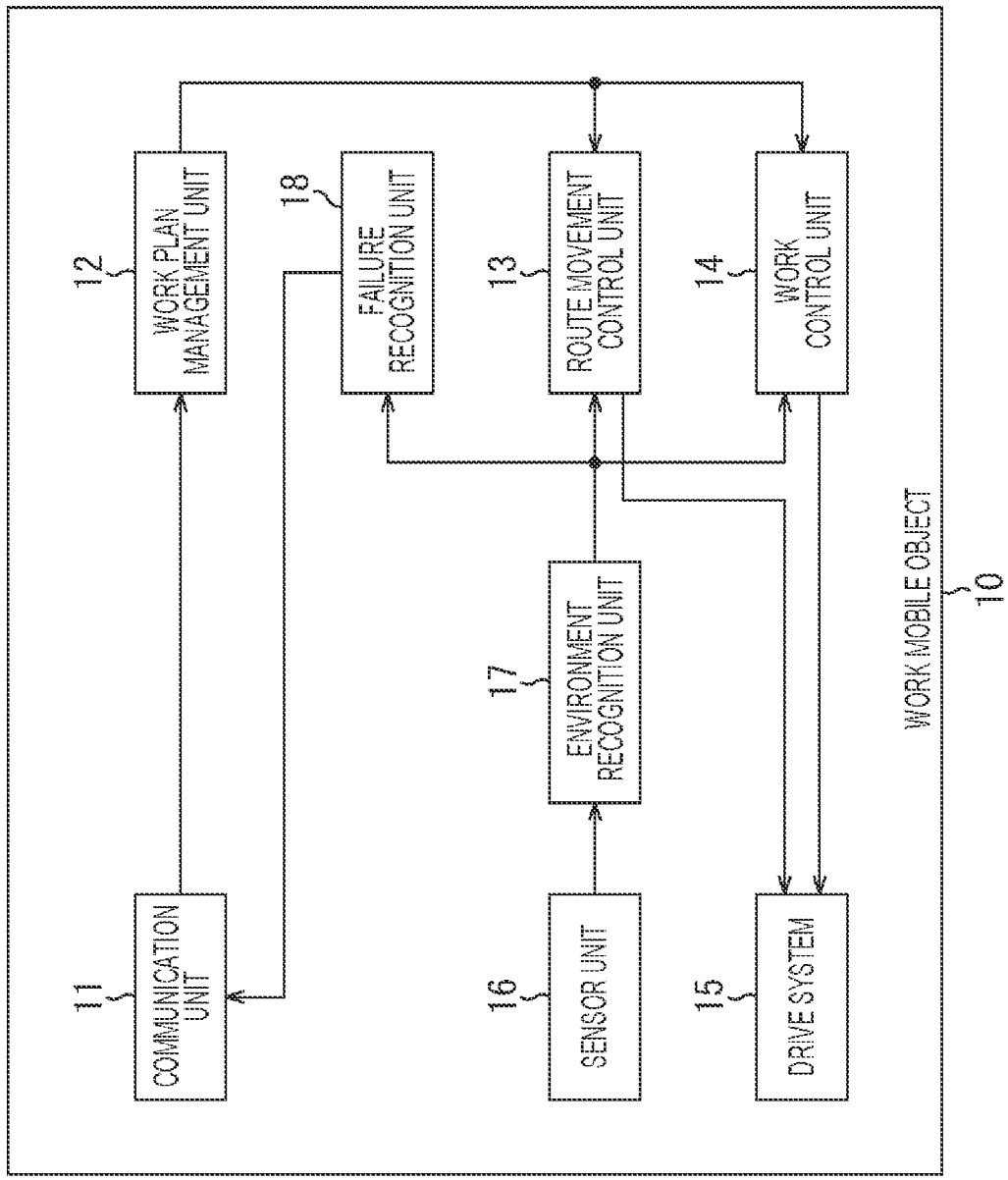
FIG. 4 is a block diagram showing a configuration example of a work mobile object 10.

FIG. 4 is a block diagram showing a configuration example of the work mobile object 10.

The work mobile object 10 includes a communication unit 11, a work plan management unit 12, a route movement control unit 13, a work control unit 14, a drive system 15, a sensor unit 16, an environment recognition unit 17, and a failure recognition unit 18.

The communication unit 11 performs wireless communication with the work management server 30, the route management server 50, and the like, and exchanges necessary information.

For example, the communication unit 11 receives a work plan transmitted from the work management server 30, and supplies to the work plan management unit 12. Furthermore, for example, the communication unit 11 transmits failure information supplied from the failure recognition unit 18, to the route management server 50.

In accordance with the work plan from the communication unit 11, the work plan management unit 12 controls the route movement control unit 13 so as to cause movement to a work place where main work according to the work plan is performed, and also controls the work control unit 14 so as to cause the main work according to the work plan to be performed.

In accordance with the control of the work plan management unit 12, the route movement control unit 13 controls the drive system 15 that performs movement and main work, and moves the work mobile object 10.

Note that, from the environment recognition unit 17, the route movement control unit 13 is supplied with environmental information, which is information on an environment in which the work mobile object 10 is located, such as a recognition result of a route and other objects around the work mobile object 10, a recognition result of self-position recognition, and the like. In performing control to move the work mobile object 10, the route movement control unit 13 uses the environmental information from the environment recognition unit 17 to recognize a current position (a self-position) of the work mobile object 10 and a route to be moved.

The work control unit 14 controls the drive system 15 in accordance with the control of the work plan management unit 12, and causes the work mobile object 10 to perform the main work.

Note that, to the work control unit 14, environmental information is supplied from the environment recognition unit 17. In performing the control to cause the work mobile object 10 to perform the main work, the work control unit 14 uses the environmental information from the environment recognition unit 17, to recognize an object (for example, a cargo and the like) to be the target of the main work.

The drive system 15 includes, for example, a movement mechanism such as a wheel for movement of the work mobile object 10, an arm to grip a cargo to perform the main work, an actuator such as a motor that drives the movement mechanism and the arm, and the like. Then, the drive system 15 drives in accordance with the control of the route movement control unit 13 and the work control unit 14.

The sensor unit 16 has various sensors that sense the surroundings of the work mobile object 10, such as a camera, a microphone, and a distance sensor. The sensor unit 16 senses the surroundings of the work mobile object 10, and supplies an image, sound, a distance, and the like as sensor information representing a sensing result, to the environment recognition unit 17.

The environment recognition unit 17 uses the sensor information from the sensor unit 16 to recognize the route and other objects around the work mobile object 10 to recognize the self-position, and supplies the environmental information as a recognition result to the route movement control unit 13, the work control unit 14, and the failure recognition unit 18.

The failure recognition unit 18 uses the environmental information from the environment recognition unit 17 to recognize a route failure, and supplies failure information indicating the route failure to the communication unit 11.

In the work mobile object 10 configured as described above, the communication unit 11 receives a work plan transmitted from the work management server 30, and supplies to the work plan management unit 12.

In accordance with the work plan from the communication unit 11, the work plan management unit 12 sets, as a destination, the work place where the main work is performed according to the work plan, and supplies to the route movement control unit 13.

The route movement control unit 13 controls the drive system 15 and moves the work mobile object 10 so as to move to the work place as the destination from the work plan management unit 12.

Whereas, the failure recognition unit 18 uses the environmental information from the environment recognition unit 17 to recognize whether or not a route failure has occurred, and causes transmission of the failure information indicating the route failure from the communication unit 11 to the route management server 50, in a case where a route failure has occurred.

When the work mobile object 10 arrives at the work place as the destination, the work control unit 14 controls the drive system 15 in accordance with the control of the work plan management unit 12, to cause the work mobile object 10 to perform the main work according to the work plan.

For example, by using the environment information from the environment recognition unit 17, the work control unit 14 perform, as (control to perform) one main work, recognizing a rack on which a target cargo is placed, that is, a cargo to be subjected to the main work is placed, recognizing the target cargo stored in the rack, taking out the target cargo from the rack by driving the arm with the drive system 15, loading the target cargo on the work mobile object 10, moving to the destination, and storing the target cargo in the rack of the destination.

Then, when the work mobile object 10 completes one main work, the work mobile object 10 performs the next main work according to the work plan.

<Configuration Example of Maintenance Mobile Object 20>

Figure 5:
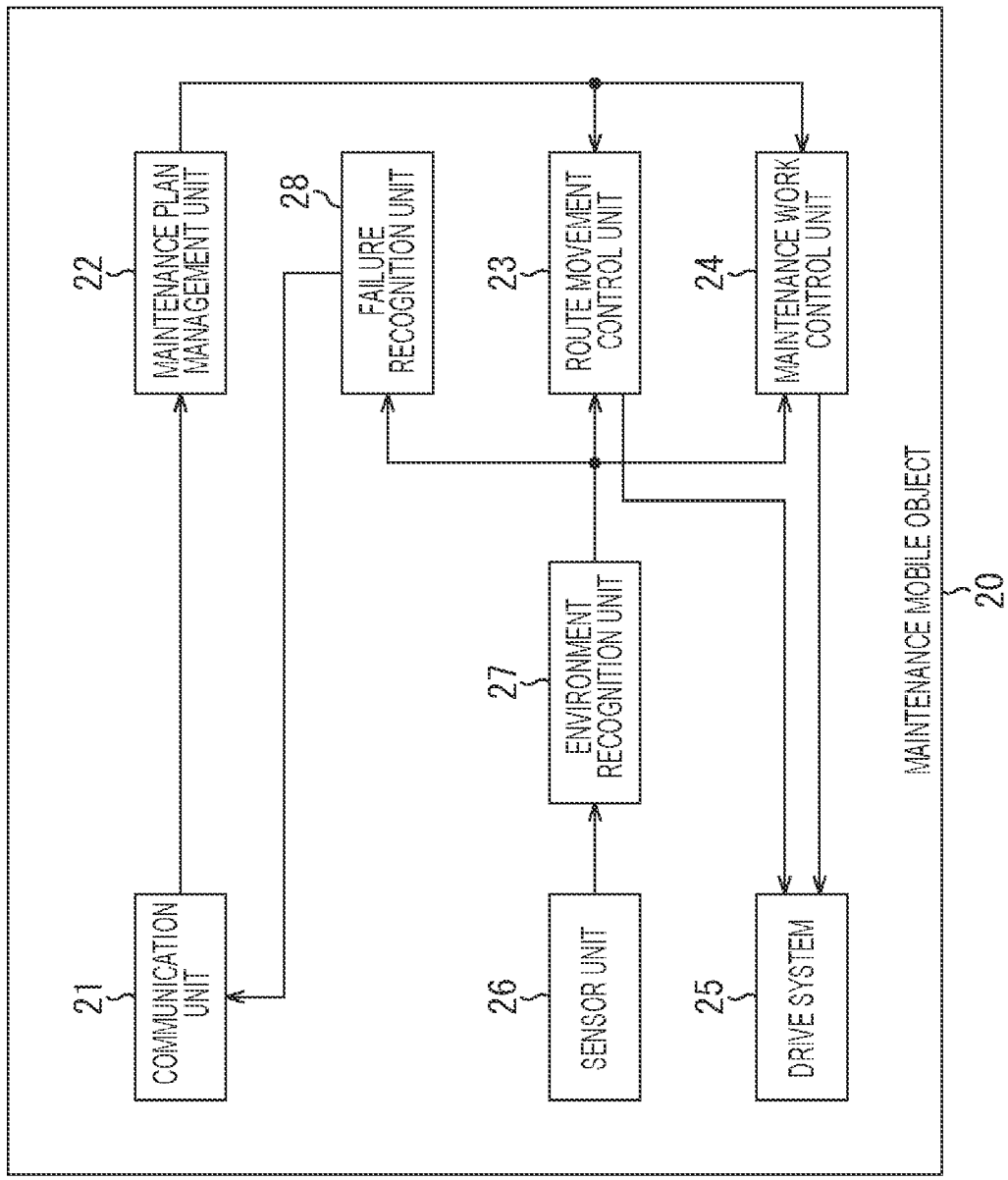
FIG. 5 is a block diagram showing a configuration example of a maintenance mobile object 20.

FIG. 5 is a block diagram showing a configuration example of the maintenance mobile object 20.

The maintenance mobile object 20 includes a communication unit 21, a maintenance plan management unit 22, a route movement control unit 23, a maintenance work control unit 24, the drive system 25, a sensor unit 26, an environment recognition unit 27, and a failure recognition unit 28.

The communication unit 21 performs wireless communication with the maintenance management server 40, the route management server 50, and the like, and exchanges necessary information.

For example, the communication unit 21 receives a maintenance plan transmitted from the maintenance management server 40, and supplies to the maintenance plan management unit 22. Furthermore, for example, the communication unit 21 transmits failure information supplied from the failure recognition unit 28, to the route management server 50.

The maintenance plan management unit 22 controls, in accordance with a maintenance plan from the communication unit 21, the route movement control unit 23 so as to cause movement to a work place where the maintenance work is performed according to the maintenance plan, and also controls the maintenance work control unit 24 so as to cause maintenance work according to the maintenance plan to be performed.

In accordance with the control of the maintenance plan management unit 22, the route movement control unit 23 controls the drive system 25 that performs movement and maintenance work, to move the maintenance mobile object 20.

Note that, from the environment recognition unit 27, the route movement control unit 23 is supplied with environmental information, which is information on an environment in which the maintenance mobile object 20 is located, such as a recognition result of a route and other objects around the maintenance mobile object 20, a recognition result of self-position recognition, and the like. In performing control to move the maintenance mobile object 20, the route movement control unit 23 uses the environmental information from the environment recognition unit 27, to recognize a current position of the maintenance mobile object 20 and a route to be moved.

The maintenance work control unit 24 controls the drive system 25 in accordance with the control of the maintenance plan management unit 22, and causes the maintenance mobile object 20 to perform the maintenance work.

Note that, to the maintenance work control unit 24, environmental information is supplied from the environment recognition unit 27. In performing the control to cause the maintenance mobile object 20 to perform the maintenance work, the maintenance work control unit 24 uses the environmental information from the environment recognition unit 27, to recognize the work mobile object 10 and the like to be the target of the maintenance work.

The drive system 25 includes, for example, a movement mechanism such as a wheel for movement of the maintenance mobile object 20, an arm to perform the maintenance work, an actuator such as a motor that drives the movement mechanism and the arm, and the like. Then, the drive system 25 drives in accordance with the control of the route movement control unit 23 and the maintenance work control unit 24.

The sensor unit 26, which is configured similarly to the sensor unit 16 in FIG. 4, senses the surroundings of the maintenance mobile object 20, and supplies an image, sound, a distance, and the like as sensor information representing a sensing result, to the environment recognition unit 27.

Similarly to the environment recognition unit 17 in FIG. 4, the environment recognition unit 27 uses sensor information from the sensor unit 26 to recognize a route and other objects around the maintenance mobile object 20 and to recognize a self-position. Then, the environment recognition unit 27 supplies the environmental information as a recognition result to the route movement control unit 23, the maintenance work control unit 24, and the failure recognition unit 28.

Similarly to the failure recognition unit 18 in FIG. 4, the failure recognition unit 28 uses the environmental information from the environment recognition unit 27 to recognize a route failure, and supplies failure information indicating the route failure to the communication unit 21.

In the maintenance mobile object 20 configured as described above, the communication unit 21 receives a maintenance plan transmitted from the maintenance management server 40, and supplies to the maintenance plan management unit 22.

In accordance with the maintenance plan from the communication unit 21, the maintenance plan management unit 22 sets, as a destination, the work place where the maintenance work is performed according to the maintenance plan, and supplies to the route movement control unit 23.

The route movement control unit 23 controls the drive system 25 and moves the maintenance mobile object 20 so as to move to the work place as the destination from the maintenance plan management unit 22.

Whereas, the failure recognition unit 28 uses the environmental information from the environment recognition unit 27 to recognize whether or not a route failure has occurred, and causes transmission of the failure information indicating the route failure from the communication unit 21 to the route management server 50, in a case where a route failure has occurred.

When the maintenance mobile object 20 arrives at the work place as the destination, the maintenance work control unit 24 controls the drive system 25 in accordance with the control of the maintenance plan management unit 22, to cause the maintenance mobile object 20 to perform the maintenance work according to the maintenance plan.

That is, for example, at the work place, the maintenance work control unit 24 uses the environmental information from the environment recognition unit 27 to recognize the work mobile object 10 to be subjected to the maintenance.

Moreover, for example, the maintenance work control unit 24 controls the drive system 25 so as to test the sensor unit 16 (FIG. 4) of the work mobile object 10 to be subjected to the maintenance.

For example, in a case where the drive system 25 has an imitation mechanism that imitates a rack and a cargo, the maintenance work control unit 24 drives the imitation mechanism by the drive system 25, and conducts a test to check whether or not the work mobile object 10 to be subjected to the maintenance can handle the cargo correctly, for a rack and a cargo under various conditions. The maintenance mobile object 20 causes the work mobile object 10 to conduct the test by transmitting a command requesting execution of the test directly or via the maintenance management server 40, from the communication unit 21 to the work mobile object 10.

Furthermore, for example, the maintenance work control unit 24 controls the drive system 25 so as to perform calibration of the sensor unit 16 of the work mobile object 10 to be subjected to the maintenance.

For example, in a case where the drive system 25 has a marker for calibration, the maintenance work control unit 24 drives the drive system 25 so as to present the marker, and uses the marker to cause the work mobile object 10 subjected to the maintenance to perform calibration of the sensor unit 16. The maintenance mobile object 20 causes the work mobile object 10 to perform the calibration by transmitting a command requesting calibration directly or via the maintenance management server 40, from the communication unit 21 to the work mobile object 10.

When the maintenance mobile object 20 completes one maintenance work, the maintenance mobile object 20 performs the next maintenance work according to the maintenance plan. That is, for example, the maintenance mobile object 20 moves to a work place where maintenance work is performed on the next work mobile object 10 to be subjected to the maintenance. Then, when there is the work mobile object 10 to be subjected to maintenance in the work place, the maintenance mobile object 20 starts the maintenance work on the work mobile object 10. Furthermore, when there is no work mobile object 10 to be subjected to maintenance in the work place, the maintenance work is started after waiting for the work mobile object 10 to be subjected to the maintenance to arrive at the work place.

Note that, after the maintenance work is completed, until the next maintenance work is started, the maintenance work control unit 24 can shift an operation mode of the maintenance mobile object 20 from a normal state in which a normal operation can be performed to a standby state in which a power consumption is reduced.

However, in a case where a power consumption required for returning from the standby state to the normal state is greater than a power consumption required for keeping the normal state, the maintenance work control unit 24 can keep the normal state as the operation mode of the maintenance mobile object 20.

That is, in a case where a (scheduled) start time for starting maintenance work can be acquired, when a power consumption required for shifting an operation mode of the maintenance mobile object 20 from the normal state to the standby state, and returning from the standby state to the normal state at a start time of the next maintenance work is not greater than a power consumption required for keeping the normal state until the start time, the maintenance work control unit 24 can shift the operation mode of the maintenance mobile object 20 from the normal state to the standby state after the maintenance work is completed, and return from the standby state to the normal state at the start time of the next maintenance work.

Furthermore, when a power consumption required for shifting the operation mode of the maintenance mobile object 20 from the normal state to the standby state, and returning from the standby state to the normal state at the start time of the next maintenance work is greater than a power consumption required for keeping the normal state until the start time, the maintenance work control unit 24 can keep the operation mode of the maintenance mobile object 20 in the normal state after the maintenance work is completed.

The control on the operation mode as described above can be applied to the work mobile object 10, in addition to the maintenance mobile object 20.

That is, when a power consumption required for shifting the operation mode of the work mobile object 10 from a normal state to a standby state, and returning from the standby state to the normal state at a start time of the next main work is not greater than a power consumption required for keeping the normal state until the start time, the operation mode of the work mobile object 10 can be shifted from the normal state to the standby state after the main work is completed, and returned from the standby state to the normal state at the start time of the next main work.

Furthermore, when a power consumption required for shifting the operation mode of the work mobile object 10 from the normal state to the standby state, and returning from the standby state to the normal state at the start time of the next main work is greater than a power consumption required for keeping the normal state until the start time, the operation mode of the work mobile object 10 can kept in the normal state after the main work is completed.

<Configuration Example of Work Management Server 30>

Figure 6:
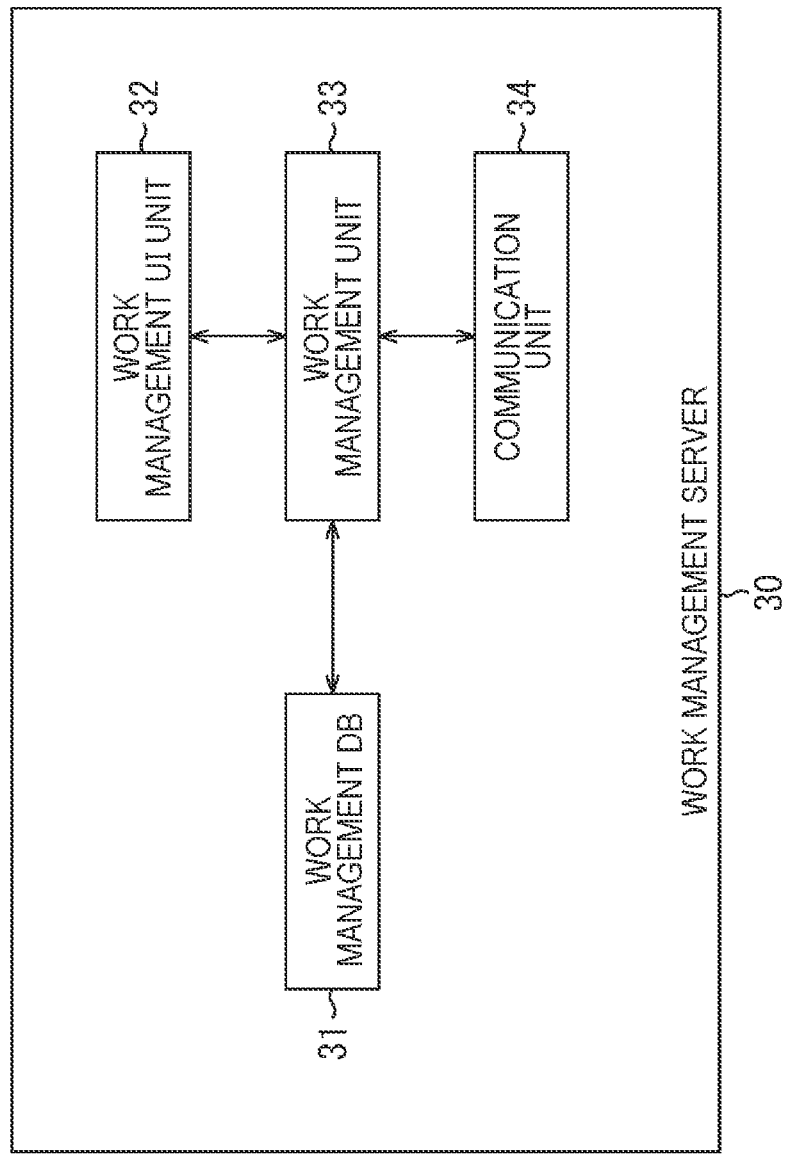
FIG. 6 is a block diagram showing a configuration example of a work management server 30.

FIG. 6 is a block diagram showing a configuration example of the work management server 30.

The work management server 30 has the work management DB 31, a work management user interface (UI) unit 32, a work management unit 33, and a communication unit 34.

The work management DB 31 stores information included in a work plan, such as the work management table and the work mobile object management table described in FIG. 3, and other information necessary for managing main work.

The work management UI unit 32 is operated by an operator of the work management server 30. For example, the operator requests the work management unit 33 to input new main work, cancel main work included in a work plan that has been already generated, and the like, by operating the work management UI unit 32.

Furthermore, the work management UI unit 32 presents various kinds of information to the operator of the work management server 30, by displaying an image or the like in accordance with the control of the work management unit 33. For example, the work management UI unit 32 presents a schedule of main work according to a work plan, a state (a condition) of the main work, and the like.

In a case where the work management UI unit 32 is operated by the operator to request input of new main work or cancellation of main work, the work management unit 33 updates the work plan stored in the work management DB 31 in accordance with the request. The work plan is updated with use of information supplied from the communication unit 34 to the work management unit 33, as required.

Moreover, the work management unit 33 generates the deterioration information described in FIG. 2.

Furthermore, the work management unit 33 causes the work management UI unit 32 to present information requested by the operator operating the work management UI unit 32.

Moreover, the work management unit 33 causes the communication unit 34 to transmit necessary information.

The communication unit 34 performs wired communication or wireless communication with the maintenance management server 40 and the route management server 50, and exchanges necessary information. Moreover, the communication unit 34 performs wireless communication with the work mobile object 10 and the maintenance mobile object 20, and exchanges necessary information.

For example, the communication unit 34 receives a maintenance plan transmitted from the maintenance management server 40 and route condition information transmitted from the route management server 50, and supplies to the work management unit 33. Furthermore, for example, the communication unit 34 transmits a work plan to the work mobile object 10 and the maintenance management server 40, and transmits deterioration information to the route management server 50 in accordance with the control of the work management unit 33.

In the work management server 30 configured as described above, the work management unit 33 generates (updates) a work plan in accordance with the early completion policy, the power saving policy, or a policy that combines the early completion policy and the power saving policy, and causes the work management DB 31 to store.

Moreover, the work management unit 33 causes transmission of the work plan from the communication unit 34 to the work mobile object 10 and the maintenance management server 40.

The communication unit 34 receives the route condition information transmitted from the route management server 50, and supplies to the work management unit 33. The work management unit 33 generates deterioration information for the route condition information from the communication unit 34, and causes transmission from the communication unit 34 to the route management server 50.

<Configuration Example of Maintenance Management Server 40>

Figure 7:
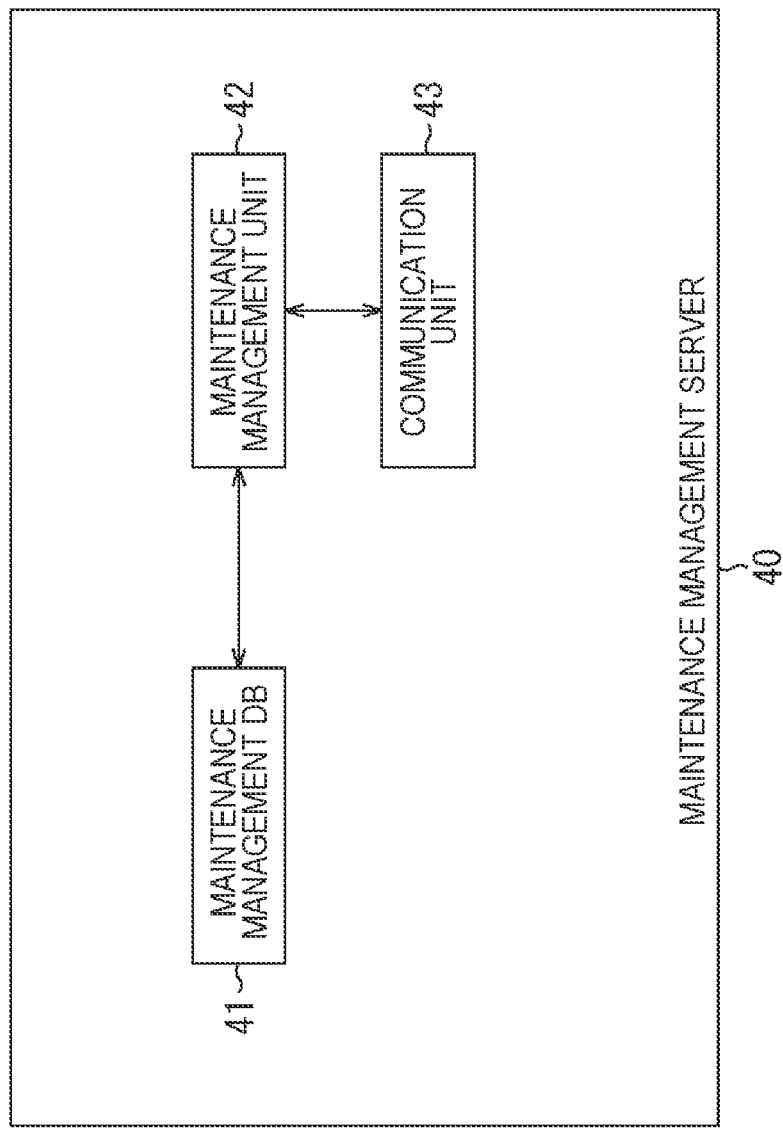
FIG. 7 is a block diagram showing a configuration example of a maintenance management server 40.

FIG. 7 is a block diagram showing a configuration example of the maintenance management server 40.

The maintenance management server 40 has the maintenance management DB 41, a maintenance management unit 42, and a communication unit 43.

The maintenance management DB 41 stores information included in a maintenance plan, such as the maintenance management table and the maintenance mobile object management table described in FIG. 3, and other information necessary for managing the maintenance work.

The maintenance management unit 42 generates a maintenance plan so as to perform maintenance on each work mobile object 10 at a predetermined maintenance interval. The maintenance plan is generated (updated) by using, as required, information supplied from the communication unit 43 to the maintenance management unit 42.

Moreover, the maintenance management unit 42 generates the deterioration information described in FIG. 2.

Furthermore, the maintenance management unit 42 causes the communication unit 43 to transmit necessary information.

The communication unit 43 performs wired communication or wireless communication with the work management server 30 and the route management server 50, and exchanges necessary information. Moreover, the communication unit 43 performs wireless communication with the work mobile object 10 and the maintenance mobile object 20, and exchanges necessary information.

For example, the communication unit 43 receives a work plan transmitted from the work management server 30 and route condition information transmitted from the route management server 50, and supplies to the maintenance management unit 42. Furthermore, for example, in accordance with the control of the maintenance management unit 42, the communication unit 43 transmits the maintenance plan to the maintenance mobile object 20 and the work management server 30, and transmits deterioration information to the route management server 50.

In the maintenance management server 40 configured as described above, the maintenance management unit 42 generates a maintenance plan in accordance with the early completion policy, the power saving policy, or a policy that combines the early completion policy and the power saving policy, and causes the maintenance management DB 41 to store.

Moreover, the maintenance management unit 42 causes transmission of the maintenance plan from the communication unit 43 to the maintenance mobile object 20 and the work management server 30.

The communication unit 43 receives the route condition information transmitted from the route management server 50, and supplies to the maintenance management unit 42. The maintenance management unit 42 generates deterioration information for the route condition information from the communication unit 43, and causes transmission from the communication unit 43 to the route management server 50.

Furthermore, the maintenance management unit 42 updates a maintenance plan as required and stores in the maintenance management DB 41, and also causes transmission from the communication unit 43 to the maintenance mobile object 20 and the work management server 30.

The maintenance plan is updated, for example, in a case where a new work mobile object 10 or maintenance mobile object 20 is added to the work area, in a case where the work mobile object 10 or the maintenance mobile object 20 placed in the work area is removed from the work area for repair and the like, in a case where new main work is added or main work is canceled, and the like.

<Configuration Example of Route Management Server 50>

Figure 8:
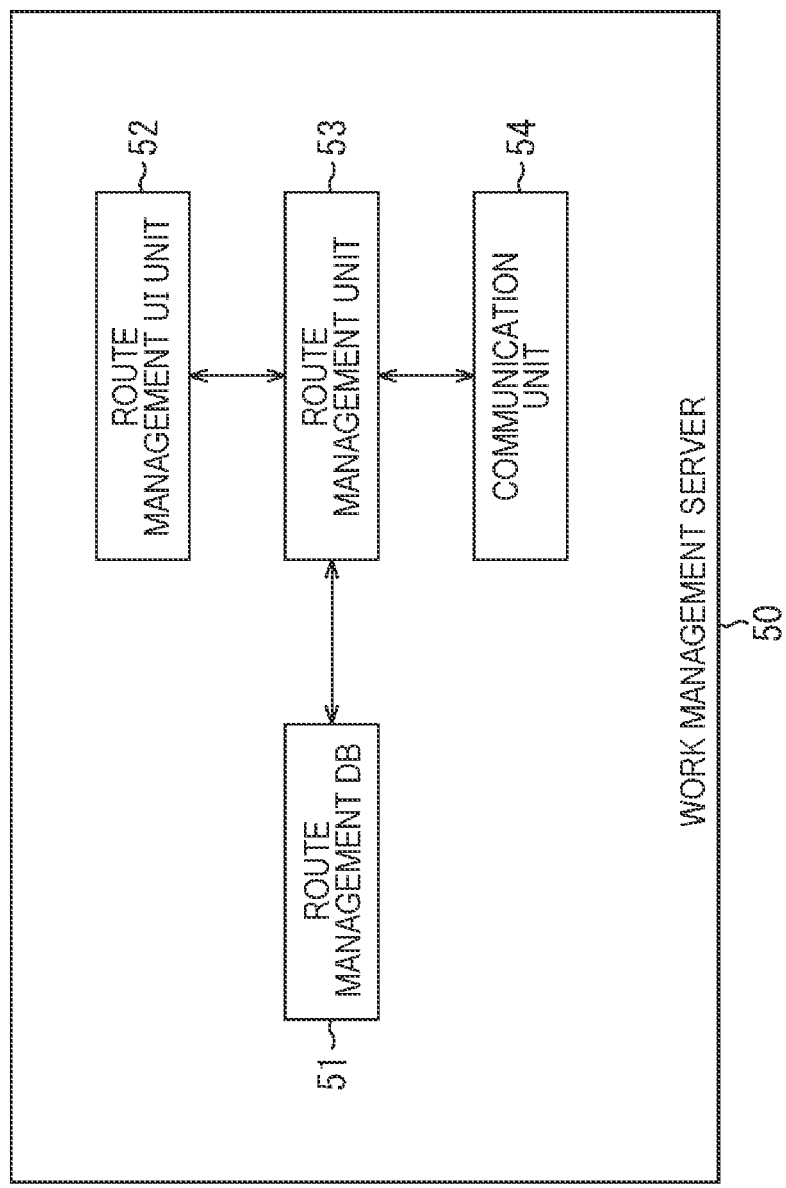
FIG. 8 is a block diagram showing a configuration example of a route management server 50.

FIG. 8 is a block diagram showing a configuration example of the route management server 50.

The route management server 50 has the route management DB 51, a route management UI unit 52, a route management unit 53, and a communication unit 54.

The route management DB 51 stores information included in the route condition information, such as the route management table described in FIG. 3 and other information regarding the route, and a recovery plan, and the like.

The route management UI unit 52 is operated by an operator of the route management server 50. For example, by operating the route management UI unit 52, the operator can input failure information of a route notified by some method, and supply from the route management UI unit 52 to the route management unit 53.

Furthermore, the route management UI unit 52 presents various kinds of information to the operator of the route management server 50, by displaying an image or the like in accordance with the control of the route management unit 53. For example, the route management UI unit 52 presents a recovery plan stored in the route management DB 51, route condition information, and other information regarding the route.

The route management unit 53 updates the recovery plan stored in the route management DB 51 in a case where the failure information is obtained, that is, when a failure occurs in the route. The recovery plan is updated with use of information supplied from the communication unit 54 to the route management unit 53, as required.

Moreover, in a case where the failure information is obtained, the route management unit 53 generates route condition information including the failure information and causes the route management DB 51 to store.

Furthermore, the route management unit 53 causes the route management UI unit 52 to present information requested by the operator operating the route management UI unit 52.

Moreover, the route management unit 53 causes the communication unit 54 to transmit necessary information.

The communication unit 54 performs wired communication or wireless communication with the work management server 30 and the maintenance management server 40, and exchanges necessary information. Moreover, the communication unit 54 performs wireless communication with the work mobile object 10 and the maintenance mobile object 20, and exchanges necessary information.

For example, the communication unit 54 transmits the route condition information to the work management server 30 and the maintenance management server 40, in accordance with the control of the route management unit 53. Moreover, in response to the transmission of the route condition information to the work management server 30 and the maintenance management server 40, the communication unit 54 receives deterioration information transmitted from the work management server 30 and the maintenance management server 40, and supplies to the route management unit 53. Furthermore, for example, the communication unit 54 receives failure information transmitted from the work mobile object 10 and the maintenance mobile object 20, and supplies to the route management unit 53.

Note that, in the work system of FIG. 1, a sensor that senses a route failure and transmits the failure information in response to a sensing result can be provided in the work area. In this case, the communication unit 54 can receive the failure information transmitted from the sensor provided in the work area, and supply to the route management unit 53.

In the route management server 50 configured as described above, when the failure information is supplied from the route management UI unit 52 or the communication unit 54, the route management unit 53 updates a recovery plan in accordance with the early completion policy, the power saving policy, or a policy that combines the early completion policy and the power saving policy, and causes the route management DB 51 to store.

Moreover, the route management unit 53 displays a recovery plan by controlling the route management UI unit 51, to present the recovery plan to the operator of the route management server 50.

An operator who receives the presentation of the recovery plan, or a recovery worker who receives an instruction from the operator, performs the recovery work to recover the route in accordance with the recovery plan.

Note that, in the work area, a movable recovery mobile object that performs recovery work can be arranged. In this case, the route management server 50 can transmit a recovery plan to the recovery mobile object, and the recovery mobile object can perform the recovery work in accordance with the recovery plan.

<Transport System to which Work System is Applied>

Figure 9:
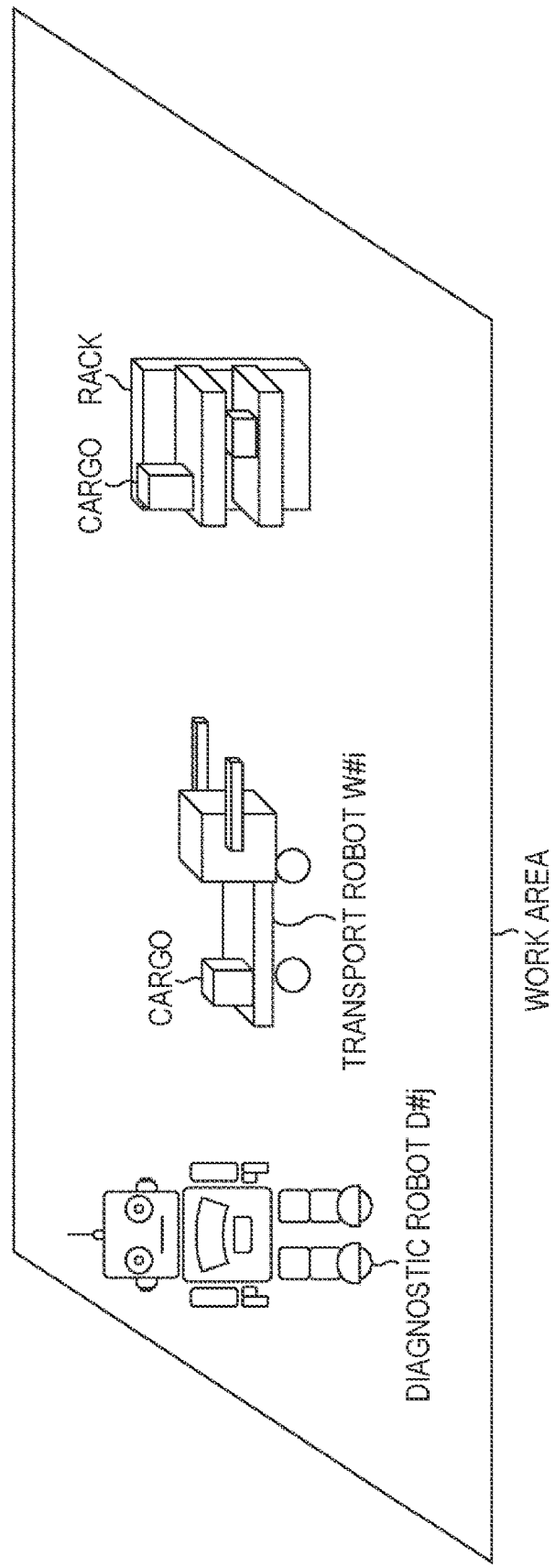
FIG. 9 is a view for explaining an outline of a transport system to which the work system is applied.

FIG. 9 is a view for explaining an outline of a transport system to which the work system of FIG. 1 is applied.

In FIG. 9, the transport system includes a transport robot W #i, a diagnostic robot D #j, and a rack.

Note that, in FIG. 9, the transport robot W #i, the diagnostic robot D #j, and the rack are illustrated one by one in order to avoid the figure becoming complicated, but one or more transport robots W #i and one or more diagnostic robots D #j can be provided in the transport system. Furthermore, in the transport system, a plurality of racks is provided.

In FIG. 9, the transport robot W #i is the work mobile object 10, and the diagnostic robot D #j is the maintenance mobile object 20. Note that the transport system also includes the work management server 30, the maintenance management server 40, and the route management server 50, but the illustration thereof is omitted in FIG. 9.

In the transport system, the transport robot W #i performs main work of transporting and storing a cargo (freight) in a certain rack to another rack in a work area. The diagnostic robot D #j performs maintenance work for maintenance of the transport robot W #i in the work area, and therefore various kinds of diagnosis are performed on the transport robot W #i.

Figure 10:
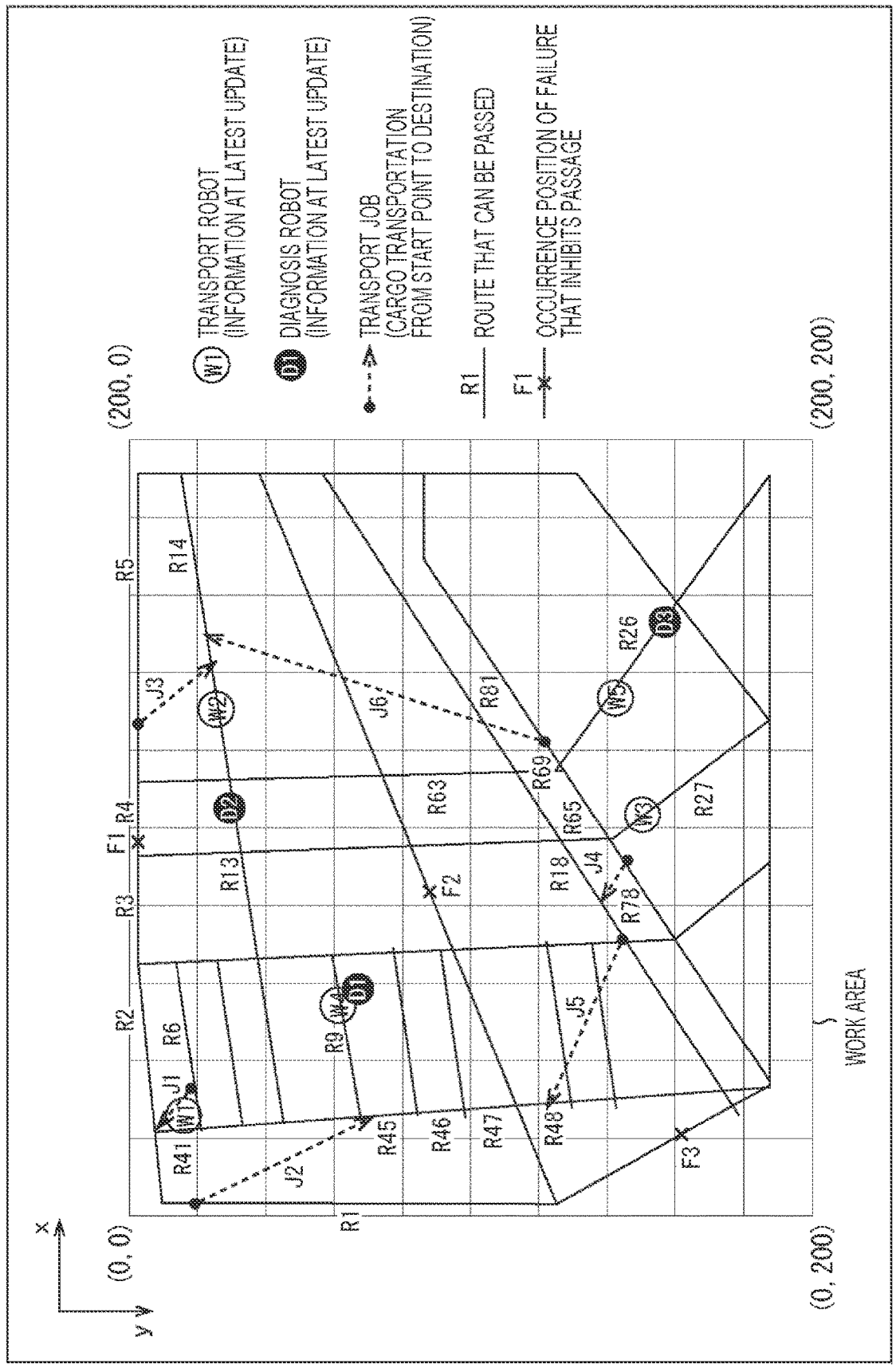
FIG. 10 is a plan view showing an example of a work area of the transport system.

FIG. 10 is a plan view showing an example of a work area of the transport system of FIG. 9.

A position of the work area will be expressed in coordinates (x, y) in which an x-axis is a left to right direction and a y-axis is a top to bottom direction. In FIG. 10, (coordinates) of an upper left position of a rectangular work area is (0, 0), and a lower right position is (200, 200).

In the work area of FIG. 10, five transport robots W1, W2, W3, W4, and W5 and three diagnostic robots D1, D2, and D3 are arranged. The transport robot W #i and the diagnostic robot D #j move along a route R #a in the work area.

Note that, in the work area shown in FIG. 10, F #b represents a route failure occurring in the route R #a, and J #c represents a transport job as main work to be performed by the transport robot W #i.

The transport robot W #i recognizes other transport robots W #i', the diagnostic robot D #j, a cargo on the route R #a, and other obstacles, from an image captured by a camera, which is one of sensors included in the sensor unit 16 (FIG. 4). Then, the transport robot W #i moves on the route R #a while avoiding obstacles.

In a case where the transport robot W #i recognizes a point that cannot be passed while moving on the route R #a, the transport robot W #i transmits failure information indicating that a route failure has occurred at that point, to the route management server 50.

To a cargo transported by the transport robot W #i and a rack in which the cargo is stored, a marker (hereinafter, also referred to as an ID marker) as an identification (ID) is attached, such as a QR code (registered trademark), for specifying (identifying) the cargo and the rack. The transport robot W #i reads the ID marker from the image captured by the camera, and specifies (recognizes) the target cargo and rack.

Furthermore, the transport robot W #i has an arm, takes out the target cargo from the target rack by recognizing a position of the arm, a position of the rack, and a position of the cargo from the image captured by the camera and adjusting the position of the arm, and loads the target cargo (on an own loading platform, and the like). Moreover, the transport robot W #i loads and unloads the target cargo (from the own loading platform, and the like) and stores in the target rack.

The diagnostic robot D #j has a function of placing an obstacle on the route R #a, and a function of notifying (reporting) a diagnostic message stating that a route failure caused by the placement of the obstacle is for the purpose of diagnosis, to the route management server 50. In a case where a diagnostic message is notified from the diagnostic robot D #j to the route management server 50, thereafter, the maintenance management server 40 uses information obtained from the transport robot W #i, the diagnostic robot D #j, the route management server 50, and the like, to summarize a final result of the diagnosis of the transport robot W #i (generate a diagnosis result).

In the transport system of FIG. 9, the diagnosis of the transport robot W #i includes, for example, obstacle avoidance diagnosis, failure report diagnosis, loading diagnosis, and loading and unloading diagnosis.

In the obstacle avoidance diagnosis, it is diagnosed whether or not the transport robot W #i can avoid the obstacle.

In the obstacle avoidance diagnosis, the diagnostic robot D #j places an obstacle on the route R #a so as to allow passage, and checks whether or not the transport robot W #i can avoid the obstacle and pass. The diagnostic robot D #j notifies the maintenance management server 40 whether or not the transport robot W #i has been able to pass. Moreover, the diagnostic robot D #j notifies the maintenance management server 40 of a time required for the transport robot W #i to pass in a case where the transport robot W #i can pass.

The transport robot W #i notifies the maintenance management server 40 of logs and metrics of the route movement control unit 13 and the drive system 15 when avoiding the obstacle and passing through the route R #a.

In the failure report diagnosis, it is diagnosed whether or not the transport robot W #i can report a route failure.

In the failure report diagnosis, the diagnostic robot D #j places an obstacle on the route R #a so as to inhibit passage, and the route management server 50 checks whether or not the transport robot W #i notifies the route management server 50 of a route failure. The route management server 50 notifies the maintenance management server 40 of the presence or absence of the notification on the route failure from the transport robot W #i, and a time required for the notification in a case where there is the notification on the route failure.

Furthermore, the transport robot W #i notifies the maintenance management server 40 of various logs and metrics.

In the loading diagnosis, it is diagnosed whether or not the transport robot W #i can load the target cargo.

The diagnostic robot D #j has a form that imitates a rack, and stores a cargo for diagnosis in (the form that imitates) the rack. Moreover, the diagnostic robot D #j has a function of presenting an ID marker attached to the rack and an ID marker attached to the cargo, under various conditions such as brightness, angle, and height.

The diagnostic robot D #j checks whether or not the transport robot W #i can recognize the rack and the cargo for which the ID marker is presented under various conditions and can load the cargo from the rack. Then, the diagnostic robot D #j notifies the maintenance management server 40 whether or not the transport robot W #i has been able to load the cargo from the rack. Moreover, in a case where the transport robot W #i has been able to load the cargo from the rack, the diagnostic robot D #j notifies the maintenance management server 40 of a time required for the loading.

Furthermore, the transport robot W #i notifies the maintenance management server 40 of various logs and metrics.

In the loading and unloading diagnosis, it is diagnosed whether or not the transport robot W #i can load and unload a cargo and store in the rack.

The diagnostic robot D #j checks whether or not the transport robot W #i can load the cargo, then unload the cargo, and store in the rack for which the ID marker is presented under various conditions. Then, the diagnostic robot D #j notifies the maintenance management server 40 whether or not the transport robot W #i has been able to store the cargo in the rack. Moreover, in a case where the transport robot W #i has been able to store the cargo in the rack, the diagnostic robot D #j notifies the maintenance management server 40 of a time required for loading and unloading and storing of the cargo in the rack.

Furthermore, the transport robot W #i notifies the maintenance management server 40 of various logs and metrics.

FIG. 11 is a view showing an example of the route management table stored in the route management DB 51 of the route management server 50 in the transport system of FIG. 9.

In the route management table, a start and terminal points as two end points of all routes R #a in the work area, and a way between the start and terminal points are statically managed, and the presence or absence of a route failure ("Condition" and "Update time") is dynamically managed.

In FIG. 11, "Route information", "End point A", "End point B", "Length", "Condition", and "Update time" are registered in the route management table.

In the route management table, "Route information" represents information R #a that specifies the route R #a. "End point A" and "End point B" represent (coordinates of) two end points of the linear route R #a. "Length" represents a length of the route R #a.

In the route management table, "Condition" indicates whether or not a route failure has occurred in route R #a. In a case where there is no route failure on the route R #a, OPEN indicating that there is no route failure and that passage is allowed is registered in "Condition". In a case where there is a route failure on the route R #a, CLOSED indicating that there is a route failure and that passage is inhibited is registered in "Condition".

In the route management table, "Update time" represents a date and time when the latest update of a record (a row) has been performed.

FIG. 12 is a view showing an example of the work management table and the work mobile object management table stored in the work management DB 31 of the work management server 30 in the transport system of FIG. 9.

In the work management table, information or the like such as a start point and a terminal point for transporting a cargo, the transport robot W #i assigned to the transport job J #c, and a state of the transport job J #c (whether or not the cargo is being transported, and the like) is registered, regarding the transport job J #c as the main work to be performed by the transport robot W #i, which is the work mobile object 10.

In the work mobile object management table, a state of the transport robot W #i, which is the work mobile object 10, information on the route R #a on which the transport robot W #i is scheduled to move in the future, and the like are registered.

In FIG. 12, "Job ID", "Start", "Goal", "Status", "Work robot ID", "Estimated start time", and "Estimated completion time" are registered in the work management table.

In the work management table, "Job ID" represents information J #c that specifies the transport job J #c. "Start" and "Goal" respectively represent a start point and a terminal point for transporting a cargo in the transport job J #c.

In the work management table, "Status" represents a state of the transport job J #c. In a case where the transport job J #c is assigned to any of the transport robots W #i but has not yet been executed, ASSIGND is registered in "Status". In a case where the transport job J #c is assigned to any of the transport robots W #i and is being executed, IN PROGRESS is registered in "Status".

In the work management table, "Work robot ID" represents information W #i that specifies the transport robot W #i assigned to the transport job J #c. "Estimated start time" and "Estimated completion time" represent a date and time when the transport robot W #i is scheduled to start the transport job J #c and a date and time when the transport job J #c is scheduled to be completed. For example, "Estimated start time" is deleted in a case where the transport robot W #i starts the transport job J #c, and "Estimated completion time" is deleted in a case where the transport robot W #i completes the transport job J #c.

In FIG. 12, "Transport robot ID", "STATUS", "Job ID", "Scheduled route", "Current position", and "Update time" are registered in the work mobile object management table.

In the work mobile object management table, "Transport robot ID" represents information W #i that specifies the transport robot W #i. "STATUS" represents a state of the transport robot W #i. In a case where the transport robot W #i is executing (performing) the transport job J #c, Job Being Executed is registered in "STATUS". In a case where the transport robot W #i is moving to execute the transport job J #c, Moving For Job is registered in "STATUS". In a case where the transport robot W #i is diagnosed as maintenance by the diagnostic robot D #j, Being Diagnosed is registered in "STATUS". In a case where the transport robot W #i is in the standby state, Standby is registered in "STATUS".

In the work mobile object management table, "Job ID" represents information J #c that specifies the transport job J #c (including the transport job J #c being executed) assigned to the transport robot W #i. "Scheduled route" represents a route on which the transport robot W #i is scheduled to move. "Current position" represents a current position of the transport robot W #i, and "Update time" represents a date and time when the latest update of a record has been performed.

FIG. 13 is a view showing an example of the maintenance management table and the maintenance mobile object management table stored in the maintenance management DB 41 of the maintenance management server 40 in the transport system of the FIG. 9.

In the maintenance management table, regarding maintenance work to be performed by the diagnostic robot D #j, which is the maintenance mobile object 20, information or the like such as the diagnostic robot D #j in charge of maintenance of the transport robot W #i is registered for every transport robot W #i to be diagnosed as maintenance.

In the maintenance mobile object management table, a state of the diagnostic robot D #j, which is the maintenance mobile object 20, and information or the like such as the route R #a on which the diagnostic robot D #j is scheduled to move in the future is registered.

In FIG. 13, "Maintenance work ID", "Transport robot ID", "Diagnosis status", "Diagnostic robot ID", and "Update time" are registered in the maintenance management table.

In the maintenance management table, "Maintenance work ID" represents information that specifies maintenance work to be performed by the diagnostic robot D #j. "Transport robot ID" represents information W #i that specifies the transport robot W #i to be diagnosed as maintenance.

In the maintenance management table, "Diagnosis status" represents a maintenance state of the transport robot W #i. In a case where maintenance of the transport robot W #i has been completed (finished), Diagnosed is registered in "Diagnosis status". In a case where maintenance of the transport robot W #i is scheduled but has not yet been executed, To Be Diagnosed is registered in "Diagnosis status". In a case where maintenance of the transport robot W #i is actually being executed, Being Diagnosed is registered in "Diagnosis status". Maintenance work for performing maintenance as diagnosis with "Diagnosis status" of Being Diagnosed or To Be Diagnosed is the existing maintenance work.

In the maintenance management table, "Diagnostic robot ID" represents information D #j that specifies the diagnostic robot D #j in charge of maintenance of the transport robot W #i. "Update time" represents a date and time when the latest update of a record has been performed.

In FIG. 13, in the maintenance mobile object management table, "Diagnostic robot ID", "STATUS", "Diagnosis target transport robot ID", "Scheduled route", "Current position", "Update time", and "Next medical treatment completion schedule" are registered.

In the maintenance mobile object management table, "Diagnostic robot ID" represents information D #j that specifies the diagnostic robot D #j. "STATUS" represents a state of the diagnostic robot D #j. In a case where the diagnostic robot D #j is actually performing maintenance work, Being Diagnosed is registered in "STATUS". In a case where the diagnostic robot D #j is moving to perform maintenance work, Moving For Diagnosis is registered in "STATUS". In a case where the diagnostic robot D #j is in a standby state, Standby is registered in "STATUS".

In the maintenance mobile object management table, "Diagnosis target transport robot ID" represents information W #i that specifies the transport robot W #i for which the diagnostic robot D #j is in charge of diagnosis as maintenance. In a case where the diagnostic robot D #j is in charge of maintenance of a plurality of transport robots W #i, (the information W #i to specify) the plurality of transport robots W #i for which the diagnostic robot D #j in charge of maintenance is registered in the order of performing the maintenance, in "Diagnosis target transport robot ID".

In the maintenance mobile object management table, "Scheduled route" represents a route on which the diagnostic robot D #j is scheduled to move. "Current position" represents a current position of the diagnostic robot D #j, and "Update time" represents a date and time when the latest update of a record has been performed. "Next medical treatment completion schedule" indicates a date and time when diagnosis as the latest maintenance of which the diagnostic robot D #j is in charge is scheduled to be completed.

For example, here, suppose that the operator of the work management server 30 inputs a transport job J6 as new main work in a case where the work area is in a state shown in FIG. 10.

In this case, as shown in FIG. 12, the work management server 30 registers (adds) information of the transport job J6 as new main work in a bottom row of the work management table. According to the work management table in FIG. 12, the transport job J6 is work for transporting a cargo from a start point (122,121) which is "Start", to a terminal point (150, 21) which is "Goal".

The work management server 30 further refers to the work mobile object table of FIG. 12, and assigns, to the transport job J6 as new main work, a transport robot W5 having "Current position" at a position (134,143) near the start point (122,121) of the transport job J6, and "STATUS" of Standby.

That is, as shown in the work management table of FIG. 12, for the transport job J6, the work management server 30 registers ASSIGNED in "Status", and registers (information W5 to specify) the transport robot W5 in "Work robot ID".

The work management server 30 makes notification (transmission), to the transport robot W5, of a work plan including the assignment of the transport job J6 to the transport robot W5. The transport robot W5 notified of the work plan from the work management server 30 starts moving to the start point (122,121) of the transport job J6 in order to execute the transport job J6.

Therefore, as shown in FIG. 12, in the work management server 30, "STATUS" of the record of the transport robot W5 in the work mobile object table, that is, the record whose "Transport robot ID" is W5, is updated to from Standby to Moving For Job, and (information J6 to specify) the transport job J6 is registered in "Job ID".

The work management table and the work mobile object management table of FIG. 12 are notified from the work management server 30 to the maintenance management server 40 as a work plan.

The maintenance management server 40 uses the work plan notified from the work management server 30, to update the maintenance management table and the maintenance mobile object management table as the maintenance plan, as required, as shown in FIG. 13, for example.

That is, before the transport job J6 is assigned to the transport robot W5, as shown in FIG. 10, a diagnostic robot D3 among the diagnostic robots D1 to D3 is closest to the current position of the transport robot W5. Therefore, the diagnostic robot D3 has been assigned for maintenance of the transport robot W5.

After the transport job J6 is assigned to the transport robot W5, as shown in FIG. 10, a diagnostic robot D2 among the diagnostic robots D1 to D3 is closest to the terminal point (150, 21) of the transport job J6. Therefore, "Diagnostic robot ID" is updated such that the maintenance assignment of the transport robot W5 is changed from the diagnostic robot D3 to the diagnostic robot D2, as shown in the maintenance management table of FIG. 13.

Moreover, with the change in the maintenance assignment of the transport robot W5 from the diagnostic robot D3 to the diagnostic robot D2, as shown in the maintenance mobile object management table in FIG. 13, "Diagnosis target transport robot ID" is updated such that the transport robot W #i for which the diagnostic robot D2 is in charge of maintenance is changed from the transport robot W2 only to the transport robots W2 and W5. Furthermore, as shown in the maintenance mobile object management table in FIG. 13, "Diagnosis target transport robot ID" is updated such that the transport robot W #i for which the diagnostic robot D3 is in charge of maintenance is changed from the transport robot W5 to None.

In addition, with the change in the maintenance assignment of the transport robot W5 from the diagnostic robot D3 to the diagnostic robot D2, "STATUS", "Scheduled route", and "Next medical treatment completion schedule" are updated as appropriate in the maintenance mobile object management table.

<Description of Computer Applied with Present Technology>

Next, a series of processes of: the work plan management unit 12, the route movement control unit 13, the work control unit 14, the environment recognition unit 17, and the failure recognition unit 18 of the work mobile object 10 described above; the maintenance plan management unit 22, the route movement control unit 23, the maintenance work control unit 24, the environment recognition unit 27, and the failure recognition unit 28 of the maintenance mobile object 20; and the work management server 30, the maintenance management server 40, and the route management server 50, can be performed by hardware or also performed by software. In a case where the series of processes is performed by software, a program that forms the software is installed in a general-purpose computer and the like.

Figure 14:
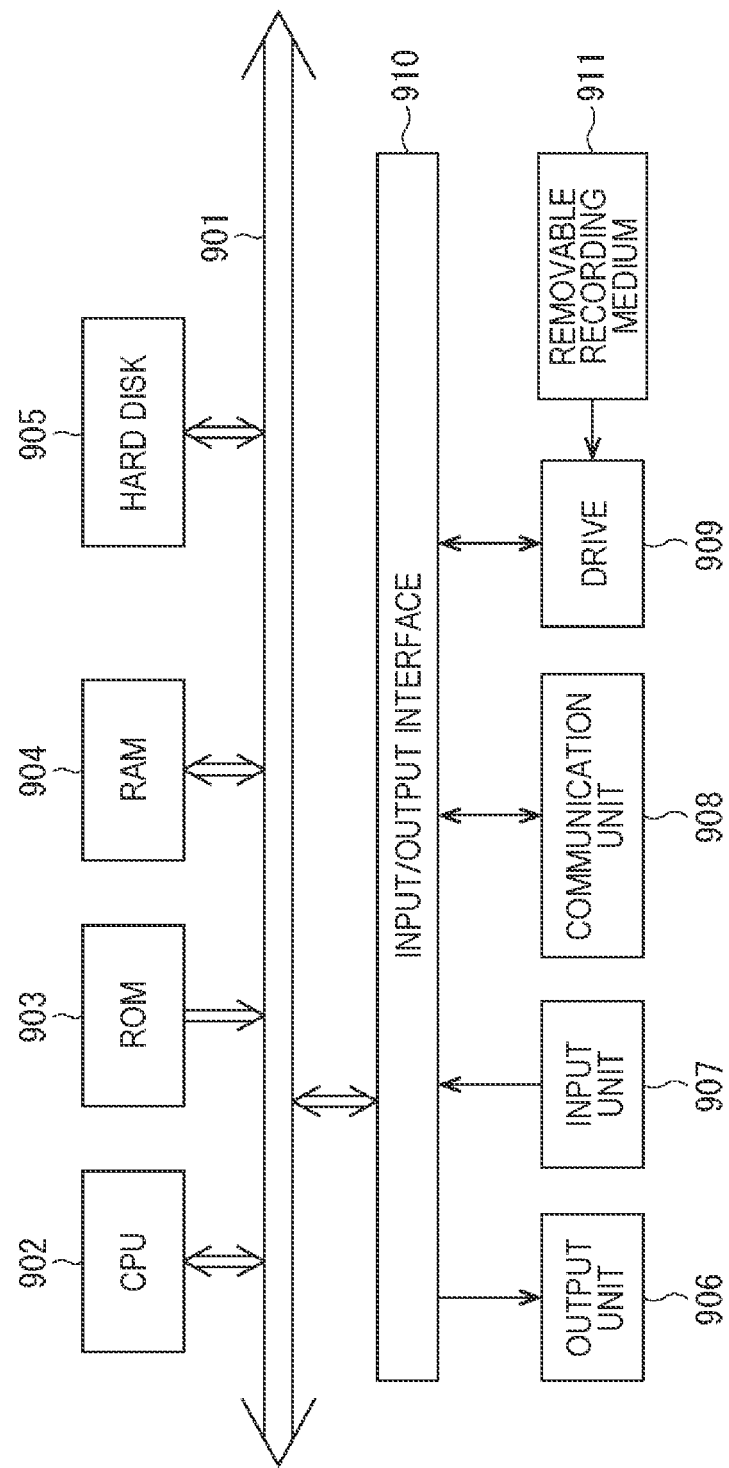
FIG. 14 is a block diagram showing a configuration example of an embodiment of a computer to which the present technology is applied.

FIG. 14 is a block diagram illustrating a configuration example of an embodiment of a computer to be installed with a program for executing the series of processes described above.

The program can be recorded in advance on a hard disk 905 or a ROM 903 as a recording medium built in the computer.

Alternatively, the program can be stored (recorded) in a removable recording medium 911 driven by a drive 909. Such a removable recording medium 911 can be provided as so-called package software. Here, examples of the removable recording medium 911 include, for example, a flexible disk, a compact disc read only memory (CD-ROM), a magneto optical (MO) disk, a digital versatile disc (DVD), a magnetic disk, a semiconductor memory, and the like.

Note that the program can be installed in the computer from the removable recording medium 911 as described above, or can be downloaded to the computer via a communication network or a broadcast network and installed in the built-in hard disk 905. That is, for example, the program can be wirelessly transferred from a download site to the computer via an artificial satellite for digital satellite broadcasting, or can be transferred by wire to the computer via a network such as a local area network (LAN) and the Internet.

The computer incorporates a central processing unit (CPU) 902, and an input/output interface 910 is connected to the CPU 902 via a bus 901.

When a command is inputted by a user operating an input unit 907 or the like via the input/output interface 910, in response to this, the CPU 902 executes a program stored in the read only memory (ROM) 903. Alternatively, the CPU 902 loads a program stored in the hard disk 905 into a random access memory (RAM) 904 and executes the program.

Therefore, the CPU 902 performs the processing according to the above-described flowchart or the processing performed by the configuration of the above-described block diagram. Then, as necessary, the CPU 902 causes a processing result to be outputted from an output unit 906 or transmitted from a communication unit 908 via the input/output interface 910, for example, and further to be recorded on the hard disk 905, and the like.

Note that the input unit 907 includes a keyboard, a mouse, a microphone, and the like. Furthermore, the output unit 906 includes a liquid crystal display (LCD), a speaker, and the like.

Here, in this specification, the processing performed by the computer according to the program needs not necessarily be performed in chronological order with the order described as the flowchart. That is, the processing performed by the computer according to the program includes processing executed in parallel or individually (for example, parallel processing or processing by an object).

Furthermore, the program may be processed by one computer (processor), or may be distributed and processed by a plurality of computers. Moreover, the program may be transferred to a remote computer to be executed.

Moreover, in this specification, a system means a set of a plurality of components (devices, modules (parts), and the like), and it does not matter whether or not all components are in a same housing. Therefore, a plurality of devices housed in separate housings and connected via a network, and a single device with a plurality of modules housed in one housing are both systems.

Note that the embodiment of the present technology is not limited to the above-described embodiment, and various modifications can be made without departing from the scope of the present technology.

For example, the present technology can have a cloud computing configuration in which one function is shared and processed in cooperation by a plurality of devices via a network.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

Furthermore, the effects described in this specification are merely examples and are not limited, and other effects may be present.

REFERENCE SIGNS LIST

10 Work mobile object
11 Communication unit
12 Work plan management unit
13 Route movement control unit
14 Work control unit
15 Drive system
16 Sensor unit
17 Environment recognition unit
18 Failure recognition unit
20 Maintenance mobile object
21 Communication unit
22 Maintenance plan management unit
23 Route movement control unit
24 Maintenance work control unit
25 Drive system
26 Sensor unit
27 Environment recognition unit
28 Failure recognition unit
30 Work management server
31 Work management DB
32 Work management UI unit
33 Work management unit
34 Communication unit
35 Maintenance management server
41 Maintenance management DB
42 Maintenance management unit
43 Communication unit
50 Route management server
51 Route management DB
52 Route management UI unit
53 Route management unit
54 Communication unit
901 Bus
902 CPU
903 ROM
904 RAM
905 Hard disk
906 Output unit
907 Input unit
908 Communication unit
909 Drive
910 Input/output interface
911 Removable recording medium

The invention claimed is:

1. A mobile object, comprising:
a maintenance work control unit configured to:
control a drive system that executes maintenance work based on a maintenance plan, wherein
the maintenance plan is generated based on work cost associated with at least one of a main work which is being executed based on a work plan, or the maintenance work for maintenance of a work mobile object that executes the main work; and
keep the mobile object in a normal state based on a power consumption to return from a standby state of the mobile object to the normal state is greater than a power consumption to keep the normal state.

2. The mobile object according to claim 1, wherein
the work cost is a scheduled completion time at which one of the main work or the maintenance work is completed, and
the maintenance work control unit is further configured to control the drive system based on the maintenance plan generated with priority given to make the scheduled completion time early.

3. The mobile object according to claim 1, wherein
the work cost is a total power consumption required, for at least one of the main work or the maintenance work, by the work mobile object and the mobile object respectively, and
the maintenance work control unit is further configured to control the drive system based on the maintenance plan generated with priority given to reduce the total power consumption.

4. The mobile object according to claim 1, wherein the maintenance work includes work which is executed close to the work mobile object.

5. The mobile object according to claim 1, wherein the maintenance plan is generated based on route condition information of a route on which the work mobile object and the mobile object move.

6. The mobile object according to claim 5, further comprising:
a failure recognition unit configured to recognize a failure in surrounding of the mobile object, wherein
the route condition information includes information associated with the failure recognized by the failure recognition unit.

7. The mobile object according to claim 1, wherein the maintenance work control unit is further configured to keep the mobile object in the normal state based on a power consumption required, to shift from the normal state to the standby state, and to return from the standby state to the normal state at a start time when the maintenance work is started, is greater than the power consumption required to keep the normal state until the start time.

8. A control method of a mobile object, the control method comprising:
executing maintenance work based on a maintenance plan, wherein
the maintenance plan is generated based on a work cost associated with at least one of a main work which is being executed based on a work plan, or the maintenance work for maintenance of a work mobile object that executes the main work; and
keeping the mobile object in a normal state based on a power consumption required for returning from a standby state of the mobile object to the normal state is greater than a power consumption required for keeping the normal state.

* * * * *